United States Patent
Kawasumi et al.

(10) Patent No.: US 10,073,330 B2
(45) Date of Patent: Sep. 11, 2018

(54) ILLUMINATION APPARATUS AND PROJECTION TYPE DISPLAY APPARATUS

(71) Applicant: CANON KABUSHIKI KAISHA, Tokyo (JP)

(72) Inventors: Takehito Kawasumi, Saitama (JP); Kazuhiro Inoko, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/495,201

(22) Filed: Apr. 24, 2017

(65) Prior Publication Data
US 2017/0307969 A1  Oct. 26, 2017

(30) Foreign Application Priority Data

Apr. 26, 2016 (JP) ................................ 2016-088322
Jun. 23, 2016 (JP) ................................ 2016-124963

(51) Int. Cl.
*G03B 21/20* (2006.01)
*H04N 9/31* (2006.01)

(52) U.S. Cl.
CPC ....... *G03B 21/2013* (2013.01); *G03B 21/204* (2013.01); *G03B 21/208* (2013.01); *G03B 21/2066* (2013.01); *G03B 21/2073* (2013.01); *H04N 9/3158* (2013.01); *H04N 9/3161* (2013.01)

(58) Field of Classification Search
CPC .............. G03B 21/204; G03B 21/2013; G03B 21/2033; H04N 9/3158; H04N 9/3161; H04N 9/3164
See application file for complete search history.

(56) References Cited

U.S. PATENT DOCUMENTS

| | | | |
|---|---|---|---|
| 8,894,213 B2 | 11/2014 | Sugiyama et al. | |
| 9,081,268 B2 | 7/2015 | Sugiyama et al. | |
| 9,581,887 B2 | 2/2017 | Tajiri | |
| 2011/0310353 A1* | 12/2011 | Maeda | G03B 21/2033 353/31 |
| 2012/0133904 A1 | 5/2012 | Akiyama | |

(Continued)

FOREIGN PATENT DOCUMENTS

| | | |
|---|---|---|
| JP | 2008158113 A | 7/2008 |
| JP | 2012137608 A | 7/2012 |
| JP | 2014186141 A | 10/2014 |

*Primary Examiner* — Ryan Howard
(74) *Attorney, Agent, or Firm* — Rossi, Kimms & McDowell LLP

(57) ABSTRACT

An illumination apparatus includes an illumination optical system, a first light source unit that includes a first solid-state light source, a second light source unit that includes a second solid-state light source with a characteristic different from that of the first wavelength conversion element, an optical path combining system that includes a first light guide surface, and a second light guide surface. The first light guide surface viewed from an optical axis direction of the illumination optical system does not overlap the second light guide surface and is provided at a position different from that of the second light guide surface. The optical path combining system includes a first condenser optical system, and a second condenser optical system. A predetermined condition is satisfied.

30 Claims, 22 Drawing Sheets

(56) References Cited

U.S. PATENT DOCUMENTS

2012/0327374 A1* 12/2012 Kitano .................. G03B 21/16
                                                     353/31
2015/0341605 A1* 11/2015 Yamada ............. G02B 27/0927
                                                     353/30

* cited by examiner

ILLUMINATION APPARATUS AND PROJECTION TYPE DISPLAY APPARATUS

BACKGROUND OF THE INVENTION

Field of the Invention

The present invention relates to an illumination apparatus and a projection type display apparatus.

Description of the Related Art

A so-called solid-state light source projector, which has recently been developed, irradiates as excitation light a beam emitted from a laser diode (referred to as a "LD" hereinafter) onto a fluorescent substance (phosphor), and uses wavelength-converted fluorescent light for light source light. Japanese Patent Laid-Open No. ("JP") 2012-137608 discloses this type of projector.

The projector disclosed in JP 2012-137608 includes a blue LD as an excitation light source, a light emitting element provided on a blue diffusion layer, a green fluorescent substance (phosphor) layer, and a red fluorescent substance layer on three circumferences having different diameters, and a dichroic mirror configured to combine light fluxes from the light emitting element with one another. This configuration can guide the red, green, and blue light fluxes to the illumination optical system.

In general, the fluorescent light emitted from the fluorescent substance has a broadband spectral distribution, and thus the spectral distributions from the red and green fluorescent substances have an overlapping wavelength band. Thus, the configuration disclosed in JP 2012-137608 that combines the light fluxes from two different fluorescent substances through the dichroic mirror causes a loss in the overlapping wavelength band in the spectral distribution between these two different fluorescent substances.

SUMMARY OF THE INVENTION

The present invention provides an illumination apparatus and a projection type display apparatus using the same, which can reduce a loss of light in combining light fluxes from a plurality of wavelength conversion elements having characteristics different from one another.

An illumination apparatus includes an illumination optical system configured to illuminate a light modulation element, a first light source unit that includes a first solid-state light source, a first wavelength conversion element configured to convert at least part of light from the first solid-state light source into first converted light that has a wavelength different from that of the light from the first solid-state light source, and a first light guide optical system configured to guide the light from the first solid-state light source to the first wavelength conversion element, a second light source unit that includes a second solid-state light source, a second wavelength conversion element configured to convert at least part of light from the second solid-state light source into second converted light that has a wavelength different from that of the light from the second solid-state light source and a spectral distribution different that of the first converted light, and a second light guide optical system configured to guide the light from the second solid-state light source to the second wavelength conversion element, and an optical path combining system that includes a first light guide surface configured to guide the light from the first light source unit to the illumination optical system, and a second light guide surface different from the first light guide surface and configured to guide light from the second light source unit to the illumination optical system. The first light guide surface viewed from an optical axis direction of the illumination optical system does not overlap the second light guide surface and is provided at a position different from that of the second light guide surface. The optical path combining system includes a first condenser optical system configured to form a first light source image on the first light guide surface using the light from the first light source unit, and a second condenser optical system configured to form a second light source image on the second light guide surface using the light from the second light source unit. $0.7 \leq d1/d2 \leq 1.3$ is satisfied, where d1 is a distance between the first light source image and the second light source image in the optical axis direction of the illumination optical system, and d2 is a width of the first light source image in a direction in which the first light source image and the second light source image are arranged.

Further features of the present invention will become apparent from the following description of exemplary embodiments with reference to the attached drawings.

DESCRIPTION OF THE EMBODIMENTS

Referring now to the accompanying drawings, a description will be given of illustrative embodiments of the present invention. Components in each embodiment can be properly rearranged based on a structure of an apparatus and a variety of conditions to which the present invention is applied. In other words, the present invention is not limited to the following embodiments, and various variations and modifications may be made without departing from the scope of the present invention.

First Embodiment

Referring now to FIGS. 1 to 4B, a description will be given of an illumination apparatus according to a first embodiment of the present invention.

(Configuration of Illumination Apparatus)

Figure 1:
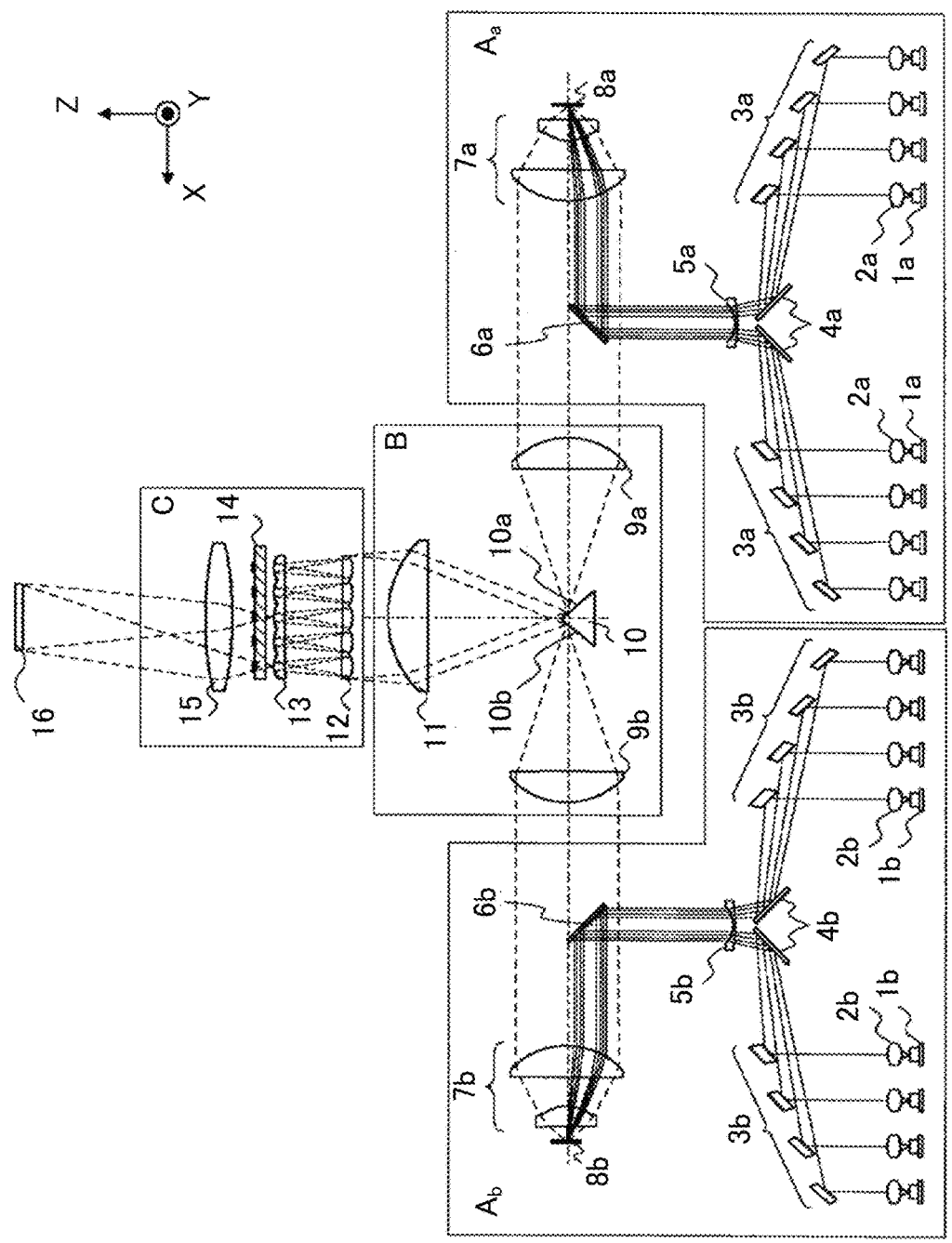
FIG. 1 illustrates a configuration of an illumination apparatus according to a first embodiment of the present invention.

FIG. 1 is a configuration diagram illustrating a configuration of an illumination apparatus according to the first embodiment of the present invention. FIG. 1 sets a Z-axis direction to a direction parallel to an optical axis of the following collimator lenses 2 (2a, 2b). An X-axis direction is set to a direction orthogonal to the Z-axis direction such that an XZ section is parallel to an optical axis of the following condenser lens unit 7 (8a, 8b) and the Z axis. The optical axis of the collimator lens 2 may not be orthogonal to the optical axis of the condenser lens unit 7. A Y-axis direction is set to a direction orthogonal to both the Z-axis direction and the X-axis direction. FIG. 1 illustrates the XZ section as illustrated coordinate axes.

Each light source unit A($A_a$, $A_b$) in this embodiment includes a light source as a blue LD 1(1a, 1b), a collimator lens 2, a paraboloid mirror array 3(3a, 3b) that includes a plurality of paraboloid mirrors each having a different radius of curvature and a different vertex coordinate, a plane mirror 4(4a, 4b), a concave lens 5(5a, 5b), a dichroic mirror 6(6a, 6b) a condenser lens unit 7, and a fluorescent substance 8(8a, 8b) as a wavelength conversion element. The condenser lens unit 7 receives, collimates, and emits fluorescent light reflected by the fluorescent substance 8. Part or all of optical elements between the light source 1 and the fluorescent substance 8 will be referred to as a light guide optical system.

The illumination apparatus according to this embodiment includes, as illustrated in FIG. 1, two light source units, i.e., a first light source unit $A_a$ and a second light source unit $A_b$, as the light source unit A. Light emitted from each light source unit enters an optical path combining system B that includes a convex lens 9, a combining prism 10, and a collimator lens 11, and then enters an illumination optical system C.

The illumination optical system C includes a first fly-eye lens 12, a second fly-eye lens 13, a polarization conversion element 14, and a condenser lens 15, and illuminates a light modulation element 16 using light from the optical path combining system B. The light modulated by the light modulation element 16 enters an unillustrated projection optical system and is projected as an image onto a target plane. The projection optical system, as used herein, may be attached to and detached from, or fixed onto a housing for holding the illumination apparatus and following color separating combining system.

A description will now be given of an optical path from a light source 1 to a light modulation element 16.

(Optical Path from Light Source 1 to Fluorescent Substance 8)

Light emitted from the light source 1 is divergent light but is collimated by a collimator lens disposed just after the light source 1. In this embodiment, the number of collimator lenses 2 is the same the number of light sources 1 but the number of collimator lenses 2 may not be equal to that of light sources 1. Light emitted from the collimator lens 2 travels in the Z-axis direction and is reflected on the paraboloid mirror array 3.

A plurality of light fluxes reflected on the paraboloid mirror array 3 condense and enter the plane mirror 4. In other words, a plurality of light fluxes from the paraboloid mirror array 3 move to the plane mirror 4 while a distance between the light fluxes reduces. The light reflected on the plane mirror 4 enters the concave lens 5. Since the concave lens 5 shares the focal position with the focus of the paraboloid mirror array 3, the light entering the concave lens 5 from the plane mirror 4 becomes parallel light and moves to the dichroic mirror 6 from the concave lens 5.

The dichroic mirror 6 has a minimum size necessary to reflect light from the concave lens 5 so as to reduce a loss of the blue light among light fluxes from the fluorescent substance 8 as described later. More specifically, on the XZ section illustrated in FIG. 1, the dichroic mirror 6 in the Z-axis direction is narrower than the maximum width of the condenser lens 7 in the Z-axis direction. Moreover, the dichroic mirror 6 in the X-axis direction may be wider than that in the X-axis direction of an area in the concave lens 5 which the light from the plane mirror 4 enters.

The width of the dichroic mirror 6 in each direction may be replaced with a width in each direction of the area coated with the following dielectric multilayer film in the dichroic mirror 6. A width in the X-axis direction of the area in the concave lens 5 which the light from the plane mirror 4 enters may be replaced with a width that is 90% or 80% as long as the external diameter of the concave lens 5.

The dielectric multilayer film is coated on the surface of the dichroic mirror 6 and has a characteristic that reflects the light from the light source 1 and transmits the fluorescent light from the fluorescent substance 8. Thus, the parallel light from the concave lens 5 is reflected on the dichroic mirror 6 and condensed on the fluorescent substance 8 by the condenser lens unit 7.

(Optical Path from Fluorescent Substance 8 to Optical Path Combiing System B)

At least part of light incident on the fluorescent substance 8 is converted into fluorescent light having a broadband spectral distribution that contains green to red components, and reflected. The remaining light is not converted into the fluorescent light and is reflected as blue light having the same spectrum as that of the light from the light source 1. In other words, the light from the fluorescent substance 8 is white light that contains red light, green light, and blue light.

The white light emitted from the fluorescent substance 8 is collimated by the condenser lens unit 7 and moves to the optical path combining system B. In this case, the white light from the fluorescent substance 8 passes the dichroic mirror 6, but the dichroic mirror 6 characteristically reflects the light from the light source 1 and transmits the fluorescent light. Hence, the blue light in the white light from the fluorescent substance 8 which transmits the dichroic mirror 6 is reflected and is not led to the light modulation element 16, causing a loss. Accordingly, in order to reduce the loss of the blue light, the dichroic mirror 6 has a minimum size necessary to reflect the light from the concave lens 5, as described above.

This embodiment can reduce the area of the dichroic mirror 6 in comparison with the sectional area of the white light from the fluorescent substance 8, since this embodiment uses the paraboloid mirror array 3 to prevent a large size and to restrain thinning of the light from the plurality of light sources 1, as described above. As a result, this embodiment can provide a small and lightweight illumination apparatus configured to reduce a loss of the blue light, as described above.

(Light Loss in Combination by Dichroic Mirror)

A description will now be given of a loss of light in the combination by the dichroic mirror in JP 2012-137608 and a configuration that reduces the loss according to each embodiment of the present invention.

Figure 2:
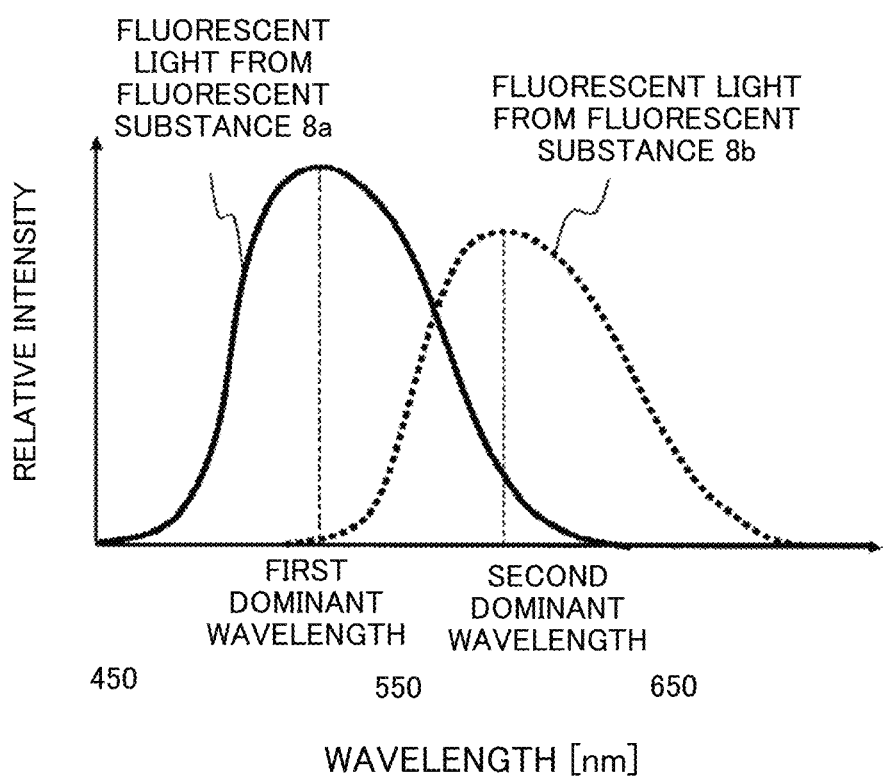
FIG. 2 illustrates spectral distributions of fluorescent light fluxes emitted from two fluorescent substances.

The fluorescent substance 8a in the first light source unit $A_a$ and the fluorescent substance 8b in the second light source unit $A_b$ have characteristics different from each other. More specifically, as illustrated in FIG. 2, the fluorescent substance 8a is a (green) fluorescent substance having a relatively large light emission amount of the green component, and the fluorescent substance 8b is a (red) fluorescent substance having a relatively large light emission amount of the red component. In other words, a dominant wavelength (first dominant wavelength) of the fluorescent light (first converted light) from the fluorescent substance 8a is different from a dominant wavelength (second dominant wavelength) of the fluorescent light (second converted light) from the fluorescent substance 8b. More specifically, as illustrated in FIG. 2, the first converted light and the second converted light have spectral distributions that are different from each other.

The dominant wavelength or peak wavelength, as used herein, means the wavelength having the highest intensity in the fluorescent light from the fluorescent substances 8a and 8b, as illustrated in FIG. 2. In this embodiment, the light from the fluorescent substance 8a has a dominant wavelength of 525 nm, and the light from the fluorescent substance 8b has a dominant wavelength of 600 nm. The relative intensity illustrated in FIG. 2 is the intensity of each wavelength when the intensity of the dominant wavelength is set to 1.

The light of the red and green components or the light of the red and green bands are defined as follows according to each embodiment of the present invention. In other words, the light of the red component or the light in the red band is defined as light having a dominant wavelength from 590 nm to 660 nm inclusive. The light of the green component or the light in the green band is defined as light having a dominant wavelength from 500 nm to 540 nm inclusive. The light of the blue component or the light in the blue band is defined as light having a dominant wavelength from 440 nm to 480 nm inclusive. The light of the yellow component or the light in the yellow band is defined as light having a dominant wavelength from 540 nm to 580 nm inclusive.

As illustrated in FIG. 2, the light flux from the fluorescent substance 8a and the light flux from the fluorescent substance 8b have such wavelength ranges that these light fluxes overlap each other. Referring now to FIG. 3, as disclosed in JP 2012-137608, a description will be given of a problem that occurs where the dichroic mirror combines two light fluxes having different spectral distributions with each other.

Figure 3A:
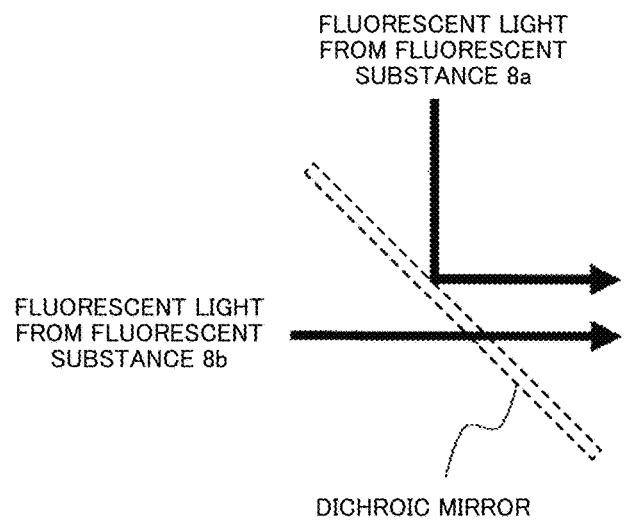
FIGS. 3A and 3B illustrate problems in combining light fluxes having two different spectral distributions.
Figure 3B:
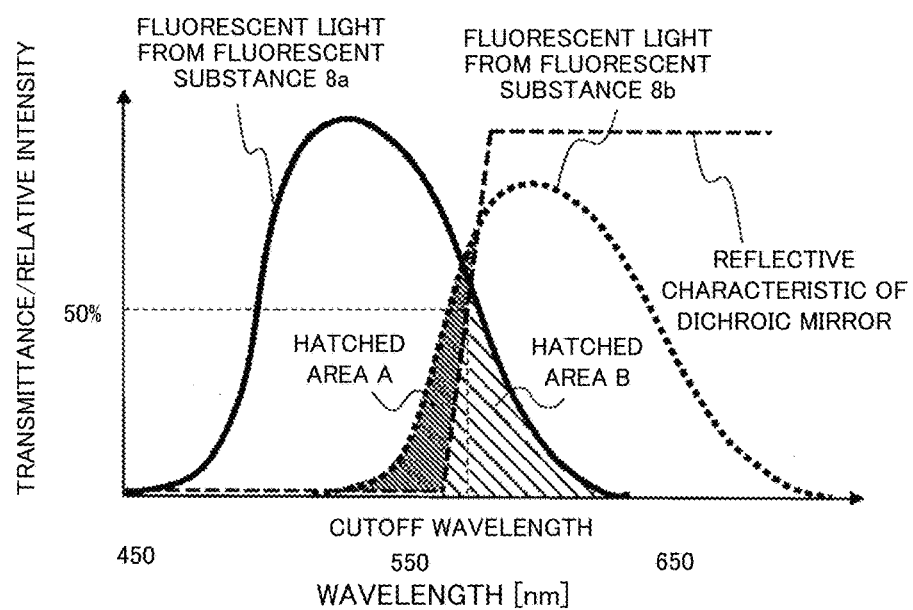

As illustrated in FIG. 3A, a general dichroic mirror is designed to transmit light with a wavelength longer than the predetermined cutoff wavelength and to reflect light with a wavelength shorter than the predetermined cutoff wavelength. More specifically, the dichroic mirror illustrated in FIG. 3A reflects the light from the fluorescent substance 8a and transmits the light from the fluorescent substance 8b. When the two fluorescent light fluxes have different spectral distributions, their wavelength bands overlap each other, and these fluorescent light fluxes are combined with each other, the light fluxes (in hatched areas A and B) before and after the cutoff wavelength for each spectral distribution are lost as illustrated in FIG. 3B. The cutoff wavelength, as used herein, means a wavelength that provides the transmittance or reflectance of 50% as illustrated in FIG. 3B.

Part of the light from the fluorescent substance 8a to be ideally entirely reflected transmits the dichroic mirror and is not led to the light modulation element 16, causing a loss. Similarly, part of the light from the fluorescent substance 8b to be ideally entirely reflected transmits the dichroic mirror and is not led to the light modulation element 16, causing a loss. In comparison with the combination using this dichroic mirror, the illumination apparatus according to each embodiment of the present invention does not use the dichroic mirror and spatially combines the light fluxes from two light source units using the optical path combining system B. Thus, this embodiment can eliminate a light loss that would otherwise occur with the dichroic mirror in comparison with the prior art. A description will now be given of how the optical path combining system B combines the light fluxes from the two light source units.

(Combination by Optical Path Combining System B)

The light from the fluorescent substance 8 is condensed and collimated by the condenser lens unit 7, and enters the optical path combining system B. The convex lens 9a (first condenser optical system) in the optical path combining system B forms a first condensed spot (first light source image) on the first reflective surface 10a as a first light guide plane using the light from the light source unit $A_a$. The convex lens 9b (second condenser optical system) forms a second condensed spot (second light source image) on the second reflective surface 10b as a second light guide plane using the light from the light source unit $A_b$.

More specifically, the combining prism 10 is disposed such that a vertex in the combining prism 10 on the side of the illumination optical system C is located in the middle of the first condensed spot and the second condensed spot. In other words, the optical path combining system B is configured such that the first condensed spot and the second condensed spot are arranged close to each other and a border between them is located on the vertex of the combining prism 10 on the side of the illumination optical system C. The combining prism 10 in this embodiment means an element configured to spatially combine light fluxes from respective light source units.

The emitted spot of the fluorescent light on the vertex of the combining prism 10 and the fluorescent substance 8 are approximately conjugate with each other with respect to the condenser lens unit and the convex lens 9. Thus, the first condensed spot formed on the first reflective surface 10a has a similar shape to that of the emitted spot of the fluorescent light on the fluorescent substance 8a. Similarly, the second condensed spot formed on the second reflective surface 10b has a similar shape to that of the emitted spot of the fluorescent light on the fluorescent substance 8b. Since the two condensed spots are arranged close to each other near the vertex of the combining prism 10, the two condensed spots can be considered substantially one new light source.
(Optical Path from Optical Path Combining System B to Illumination Optical System C)

The first reflective surface 10a and the second reflective surface 10b on the combining prism 10 form an angle of about 90°, and light from each light source unit is moved to the collimator lens 11 by the first reflective surface 10a and the second reflective surface 10b, is collimated by the collimator lens 11, and is moved to the illumination optical system C. Each embodiment of the present invention spatially combines the light fluxes from the respective light source units rather than using the dichroic mirror, and can reduce a loss of light.

That the light fluxes from respective light source units are spatially combined with each other means that the first light guide surface does not overlap the second light guide surface when they are viewed from the optical axis direction of the illumination optical system and is located at a position different from that of the second light guide surface. More specifically, this embodiment provides the second reflective surface 10b at a position different from that of the first reflective surface 10a in a direction orthogonal to the optical axis of the illumination optical system C on a plane parallel to the optical axis of the illumination optical system C and the normal of the first reflective surface 10a.

More specifically, viewing from the optical axis direction of the illumination optical system means viewing from the optical axis direction of the condenser lens 15 in the illumination optical system C. Alternatively, it may be replaced with viewing from the optical axis direction of the collimator lens 11 in the optical path combining system B. In FIG. 1, viewing from the optical axis direction of the illumination optical system is equivalent with viewing from the Z-axis direction. Assume that there is a mirror between the first fly-eye lens 12 and the third fly-eye lens 13, and the optical axis of the condenser lens 15 is parallel to the Y-axis direction. In this case, viewing from the optical direction of the illumination optical system is equivalent with viewing from the Z-axis direction as illustrated in FIG. 1, even when bending by the mirror is developed.
(Optical Path from Illumination Optical System C to Light Modulation Element 16)

The light that has entered the illumination optical system C enters the first fly-eye lens 12, is divided into a plurality of partial light fluxes, then forms substantial light source images formed near the vertex of the combining prism 10, between the first fly-eye lens 13 and the polarization conversion element 14. The second fly-eye lens 13 is disposed at a position approximately optically conjugate with the vertex of the combining prism 10 with respect to the collimator lens 11 and the first fly-eye lens 12. Thus, the light source image formed between the second fly-eye lens 13 and the polarization conversion element 14 has a similar shape to that of the substantial light source for the illumination optical system C formed near the vertex of the combining prism 10.

The plurality of partial light fluxes divided by the first fly-eye lens 12 are superimposed on the light modulation element 16 by the second fly-eye lens and the condenser lens 15, and consequently illuminate the light modulation element 16. The light modulation element 16 according to each embodiment of the present invention is a liquid crystal panel having an aspect ratio of 16:9, and forms an image by controlling the polarization state of the light incident on each pixel.
(Configuration of Polarization Conversion Element 14)

Since the fluorescent light from each light source unit is nonpolarized light, this embodiment disposes the polarization conversion element 14 just after the second fly-eye lens 13 so as to improve the light utilization efficiency.

Figure 4A:
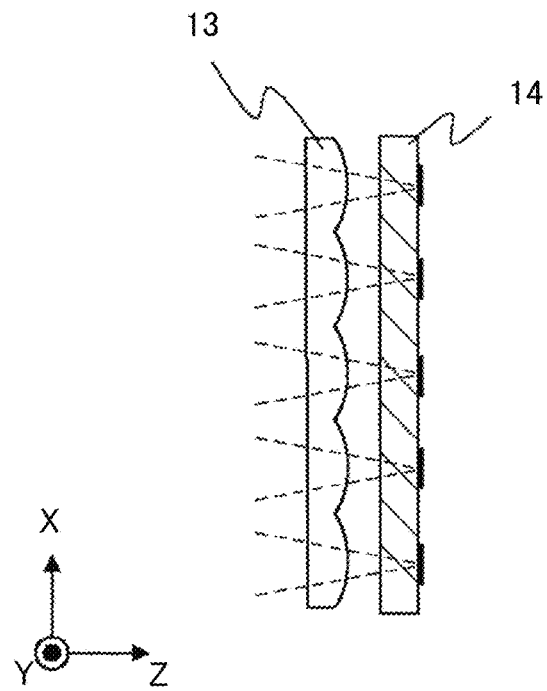
FIGS. 4A and 4B illustrate an effective area formed by a second fly-eye lens and a polarization conversion element.
Figure 4B:
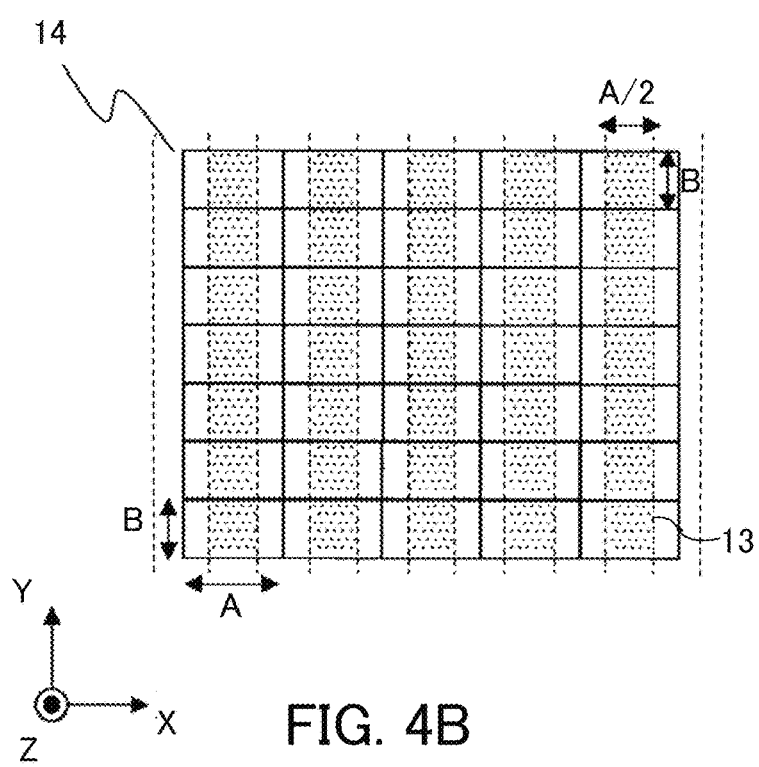

As illustrated in FIGS. 4A and 4B, the polarization conversion element 14 includes a plurality of elongated polarization beam splitters about half as wide as the lens cell in the second fly-eye lens 13, and half waveplates alternately arranged on the exit planes of the polarization beam splitters. The light incident on the light conversion element 14 is split into P-polarized light and S-polarized light by the polarization splitting film. The S-polarized light is reflected in the same direction as that of the P-polarized light by the adjacent polarization splitting film. The half waveplate disposed on the exit side of the P-polarized light converts the polarization state into that of the S-polarized light, and light fluxes have the uniform, predetermined polarization state. Alternatively, a half waveplate may be disposed on the exit side of the S-polarized light and provide the uniform polarization state of the P-polarized light.
(Reduced Light Loss in Effective Area)

In order to improve the illumination efficiency of the illumination optical system, as illustrated in FIGS. 4A and 4B, it is necessary to improve a light amount that passes the effective area formed by the lens cells in the second fly-eye lens 13 and the polarization conversion element 14. The effective area, as used herein, contains an area in which the incident light is converted into light having a desired polarization direction on the polarization conversion element 14 illustrated by a dotted line in FIG. 4B and overlaps lens cells in the second fly-eye lens 13 on the XY plane.

More specifically, where each lens cell in the second fly-eye lens 13 has a lateral length A and a longitudinal length B in this embodiment, A:B=16:9 is established, since each lens cell in the second fly-eye lens 13 has the same aspect ratio of 16:9 as that of the light modulation element in each lens cell. An effective area formed by the polarization conversion element 14 and each lens cell in the second fly-eye lens 13 has an aspect ratio of A/2:B or a rectangular shape of 8:9 in this embodiment.

The light fluxes incident on the desired polarization beam splitter in the polarization conversion element 14 in the light forming the light source image are aligned with the predetermined polarization direction. However, the light fluxes incident on the polarization beam splitter adjacent to the desired polarization beam splitter are aligned with the polarization direction orthogonal to the predetermined polarization direction. Thus, they become unnecessary light for the liquid crystal panel and the projected light becomes dark.

On the other hand, light in the light from the lens cell in the first fly-eye lens 12, which has passed the corresponding lens cell in the second fly-eye lens 13, reaches the light modulation element 16. However, the light that passes the lens cell adjacent to the corresponding lens cell illuminates the outside of the predetermined area in the light modulation element 16, and causes the projected image to be dark.

In other words, only the component that passes the effective area in the light source image formed near the effective area can finally reach the light modulation element 16. Hence, the size of the light source image for the effective area is important to the illumination efficiency. More specifically, the light source formed near the effective area may be reduced for the illumination efficiency.

Accordingly, this embodiment reduces a light amount incident on the outside of the effective area by closely arranging the condensed spots of light fluxes from the respective light sources around the vertex of the combining prism 10, as described above.

This configuration enables the illumination apparatus according to this embodiment to reduce a light loss amount when the light fluxes from the respective light source units are combined in comparison with the prior art configuration, and to also reduce a light loss amount in the effective area.
(Variation of Combining Prism 10)

Figure 9A:
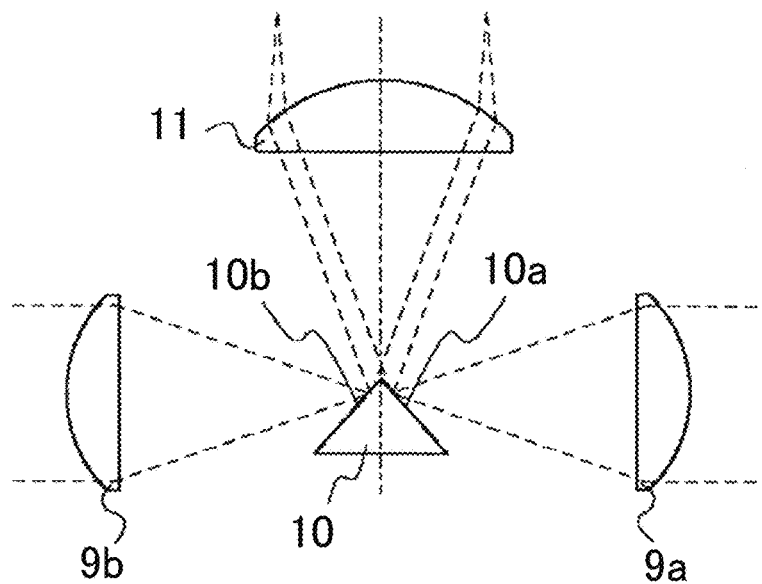
FIGS. 9A and 9B illustrates a configuration of a variation of an optical element configured to spatially combine light fluxes with each other.
Figure 9B:
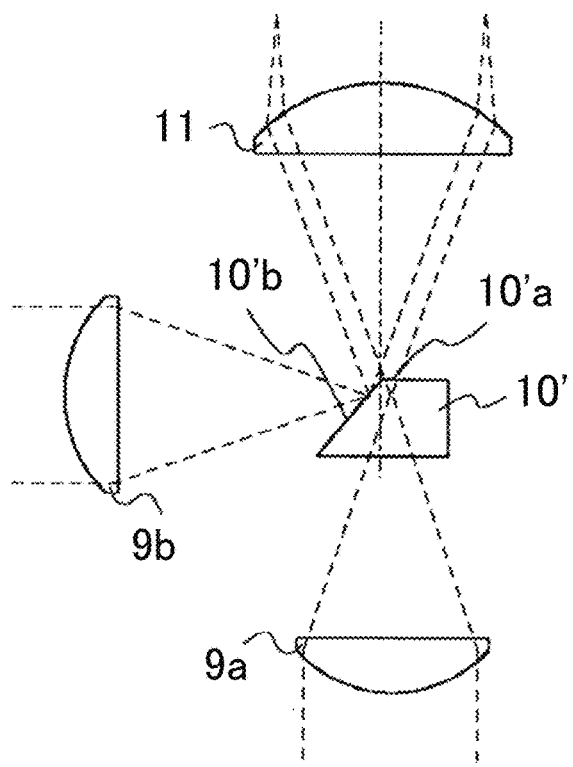

This embodiment spatially combines the light fluxes having spectral distributions different from each other, which are emitted from the two fluorescent substances, using the first reflective surface 10a and the second reflective surface 10b in the combining prism 10, as illustrated in FIG. 9A. However, the combining prism 10 is not limited to this configuration, and may combine the light fluxes from the two fluorescent substances using the combining prism 10' having a reflective surface 10'b and a transmission surface 10'a as illustrated in FIG. 9B. In other words, when the illumination apparatus includes the first light source unit $A_a$ and the second light source unit $A_b$, the first light guide surface and the second light guide surface may not necessarily have the same characteristic, as long as the optical path combining system B may include the first light guide surface and the second light guide surface. The first light source unit $A_a$ and the second light source unit $A_b$ may not be provided at positions in bilateral symmetry with respect to the optical axis of the collimator lens 11 as a symmetrical axis.
(Illustrative Embodiment)

As described above, two condensed spots are arranged close to each other near the vertex of the combining prism 10, and the illumination apparatus is configured so as to satisfy the following condition.

The first reflective surface 10a may contain an area having at least 80% of the maximum intensity in the condensed spot (first light source image) on the first reflective surface 10a when the first reflective surface 10a is viewed from the optical axis direction of the illumination optical system C. Moreover, the second reflective surface 10b may contain an area having at least 80% of the maximum intensity in the condensed spot (second light source image) on the second reflective surface 10b when the second reflective surface 10b is viewed from the optical axis direction of the illumination optical system C. In other words, a smaller light amount from each light source unit does not enter the first reflective surface 10a or the second reflective surface 10b.

Assume that d1 is a distance between the first light source image and the second light source image, and d2 is a width of the first light source image in a direction in which the first light source image and the second light source image are arranged. Then, the following expression may be satisfied.

$$0.7 \leq d1/d2 \leq 1.3 \quad (1)$$

Figures 8A, 8B, 8C:
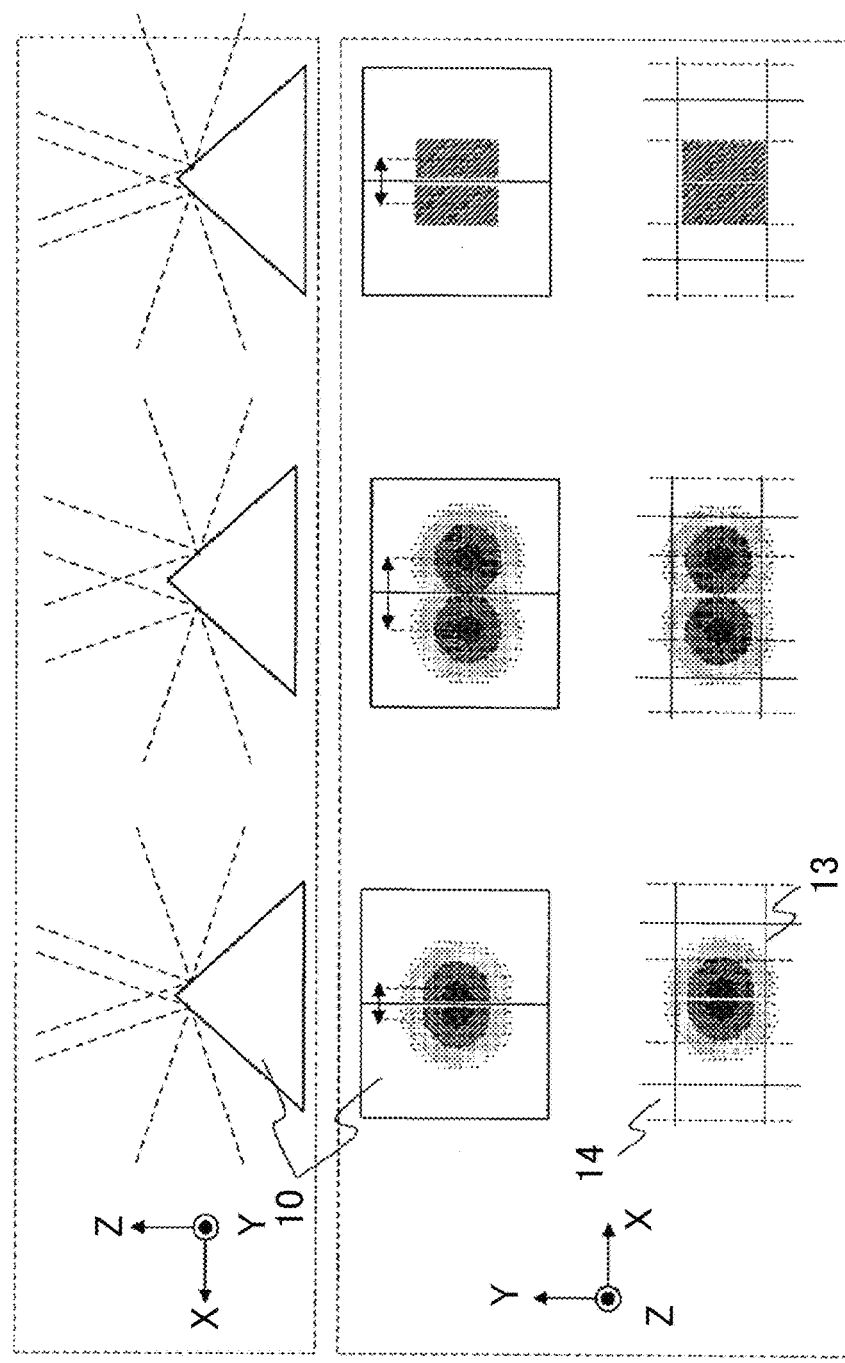
FIGS. 8A to 8C illustrate an effect of a lens array inserted into an excitation optical path.

This conditional expression (1) means that the first light source image and the second light source image area arranged adjacent to each other as illustrated in FIG. 8C. Satisfying the conditional expression (1) can reduce a light source image combined by the combining prism 10, reduce a light flux to be shielded by the subsequent optical element, and restrain a drop of the light utilization efficiency. A value of d1/d2 may be from 0.8 to 1.2 inclusive or from 0.9 to 1.1 inclusive.

Figure 5:
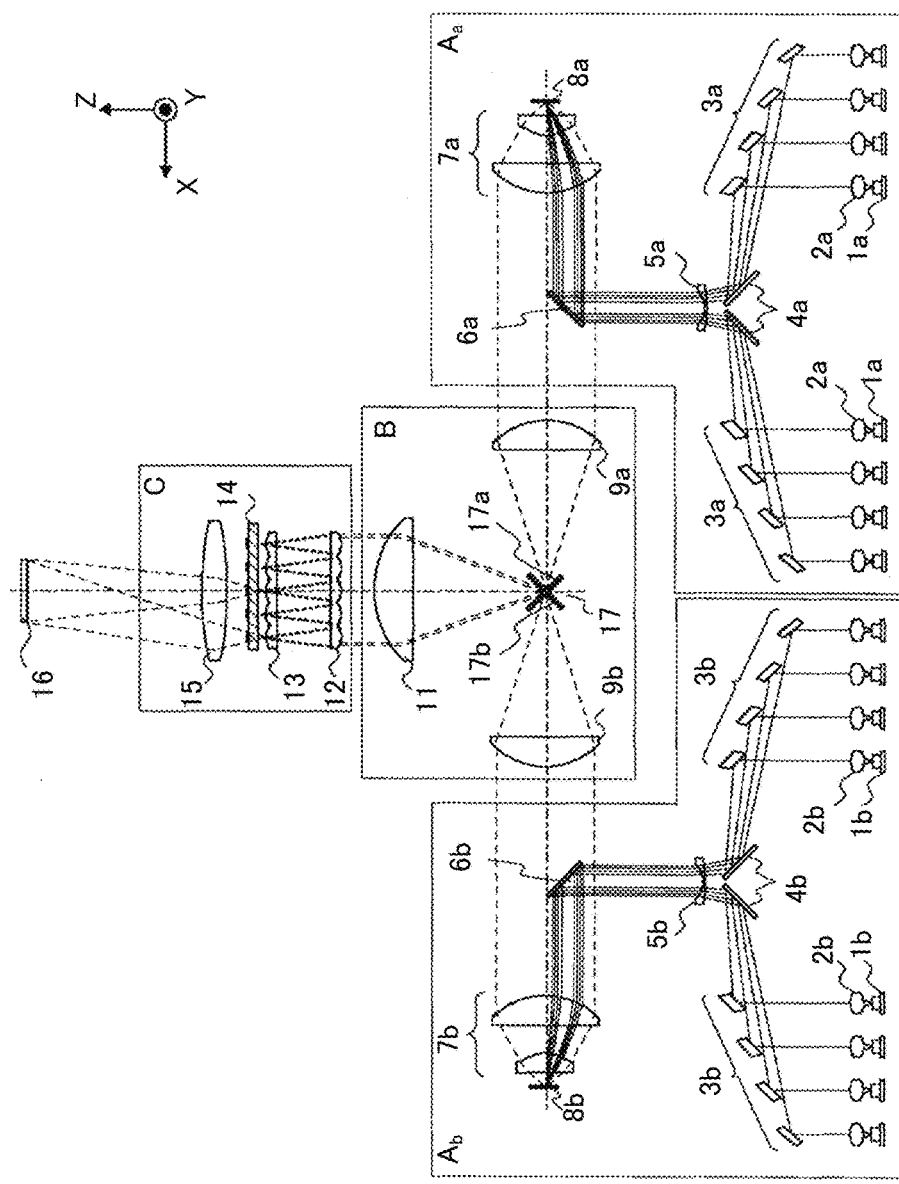
FIG. 5 illustrates a configuration of an illumination apparatus according to a second embodiment of the present invention.

The width of the light source image, as used herein, means a full width at half maximum in the intensity distribution of the optical image. The distance between the first light source image and the second light source image is a distance between positions having maximum intensities in the intensity distributions in both light source images or a distance between the center of gravity of the first light source image and the center of gravity of the second light source image. A distance between the center of the full width at half maximum in the intensity distribution of the first light source image and the center of the full width at half maximum in the intensity distribution of the second light source image may be set to the distance between the first light source image and the second light source image.
Second Embodiment FIG. 5 illustrates a configuration of an illumination apparatus according to a second embodiment of the present invention. This embodiment is different from the first embodiment in that this embodiment uses a reflection mirror (or mirror) 17 that can be more easily manufactured, rather than the combining prism 10 as an optical element configured to spatially combine light fluxes having spectral distributions different from each other and emitted from the two fluorescent substances 8a and 8b. Other than this difference, this embodiment is common to the first embodiment and a description of the entire optical system is omitted.

The first embodiment uses the first reflective surface 10a and the second reflective surface 10b in the combining prism 10 that are located at the same position in the Y-axis direction illustrated in FIG. 1 and form an angle of about 90°. Similar to the combining prism 10, a first reflection mirror 17a as a first light guide surface and a second reflection mirror 17b as a second light guide surface are located at the same position in the Y-axis direction and both mirrors form an angle of about 90°. Since each of both mirrors has a thickness of a predetermined glass plate, there is a gap of the thickness of the predetermined glass plate at contacts of both mirrors. As a result, it is difficult to arrange the condensed spots formed by both mirrors close to each other, and thus the light loss in the effective area cannot be sufficiently reduced.

Accordingly, this embodiment arranges the first reflection mirror 17a and the second reflection mirror 17b, as illustrated in FIG. 5, such that they are located at different positions in the Y-axis direction and both mirrors intersect each other when they are viewed from the Y-axis direction and form an angle of about 90°. The first embodiment aligns the condensed spots based on the light fluxes from the first light source unit $A_a$ and the second light source unit $A_b$, with the X-axis direction in the combining prism 10. On the other hand, this embodiment aligns the condensed spots based on the light fluxes from both light source units, with the Y-axis direction in the reflection mirror 17. In other words, the second reflection mirror 17b is different from the first reflection mirror 17a in that the position of the normal direction of the plane parallel to both the optical axis in the illumination optical system C and the normal of the first reflection mirror 17a.

This configuration can also combine the light fluxes from the two fluorescent substances 8a and 8b without using the dichroic mirror similar to the first embodiment, and reduce the light loss when the light fluxes from the plurality of wavelength conversion elements having characteristics different from one another in comparison with the prior art. In accordance with the configuration of the reflection mirror 17, the positions of the first light source unit $A_a$ and the second light source unit $A_b$ in the Y-axis direction may be properly adjusted.

Third Embodiment

Figure 6:
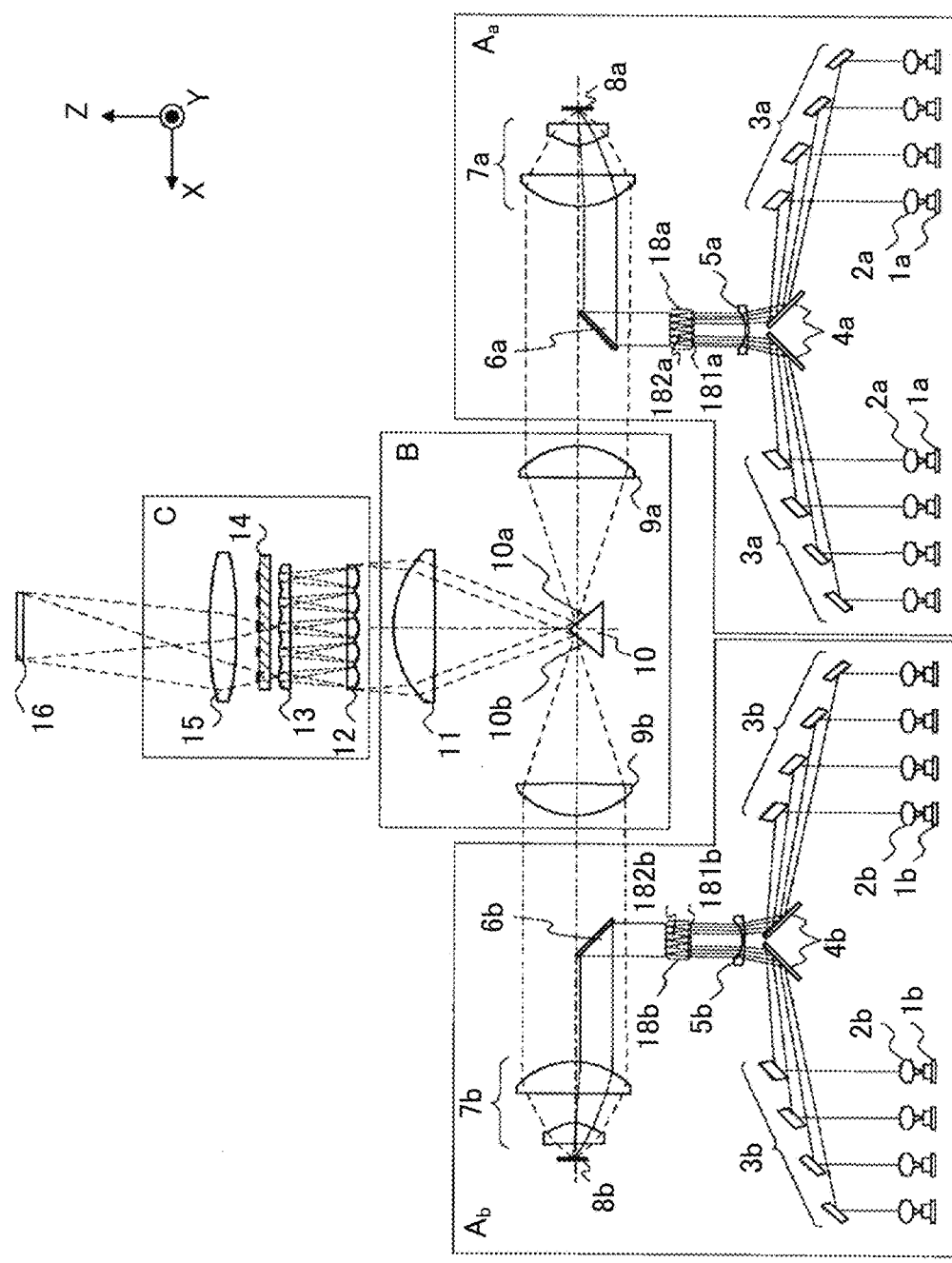
FIG. 6 illustrates a configuration of an illumination apparatus according to a third embodiment of the present invention.

FIG. 6 illustrates a configuration of an illumination apparatus according to a third embodiment of the present invention. This embodiment is different from the first embodiment in that this embodiment disposes a lens array 18(18a, 18b) that includes a plurality of lens cells arranged in a matrix shape between the concave lens 5 and the dichroic mirror 6. Other than this difference, this embodiment is common to the first embodiment and a description of the entire optical system is omitted.

(Optical Path from Concave Lens 5 to Fluorescent Substance 8 Through Lens Array 18)

The lens array 18 includes a first lens surface array 181 (181a, 181b) on an incident side, and a second lens surface array 182 (182a, 182b) on an exit side. Thus, the parallel light that exits from the concave lens 5 and enters the lens array 18 is divided into a plurality of partial light fluxes by the first lens surface array 181 and then enters the second lens surface array 182. The light that exits from the second lens surface array 182, is reflected on the dichroic mirror 6, and moves to the condenser lens unit 7.

The optical path from the dichroic mirror 6 to the fluorescent substance 8 is similar to that in each embodiment. However, each embodiment forms a condensed spot with a similar shape to that of a light emitting surface of the light source 1 on the fluorescent substance 8 in each embodiment. On the other hand, according to this embodiment, the condenser lens unit 7 superimposes a plurality of partial light fluxes from the first lens surface array 181 and forms the condensed spots on the fluorescent substance 8. In other words, the condensed lens unit 7 serves as a superimposing optical system.

The fluorescent substance 8 is located at a position approximately conjugate with each lens cell in the first lens surface array 181 with respect to the second lens surface array 182 and the condenser lens unit 7. Thus, although the light collimated by the concave lens 5 and entering the first lens surface array 181 has a nonuniform light distribution, it is divided and superimposed by the optical path. As a result, the condensed spot formed on the fluorescent substance 8 has the uniform light density distribution and a shape similar to the lens cell shape of the first lens surface array 181.

In other words, each lens cell in the first lens surface array 181 is set to an object, and a superimposed image of the lens cells is formed on the fluorescent substance 8. This configuration can prevent the light from the light source 1 from focusing on one point on the fluorescent substance 8, and the light conversion efficiency of the fluorescent substance from dropping due to the luminance saturation phenomena.

(Optical Path from Fluorescent Substance 8 to Illumination Optical System C Through Optical Path Combining System B)

An optical path from the fluorescent substance 8 to the illumination optical system C via the optical path combining system B is similar to that of each embodiment, and combines the light fluxes from the two light source units using the combining prism 10 similar to the first embodiment, rather than the dichroic mirror.

(Relationship Between First Lens Surface Array 181 and Effective Area)

Similar to each embodiment, light source images are formed near the effective area between the second fly-eye lens 13 and the polarization conversion element 14 based on the light that has entered the illumination optical system C, and the light fluxes from the light source images are superimposed on the light modulation element via the condenser lens 15. However, the light source image formed near the effective area is different from that in each embodiment, and a description thereof will be given with reference to FIGS. 7A and 7B.

Figure 7A:
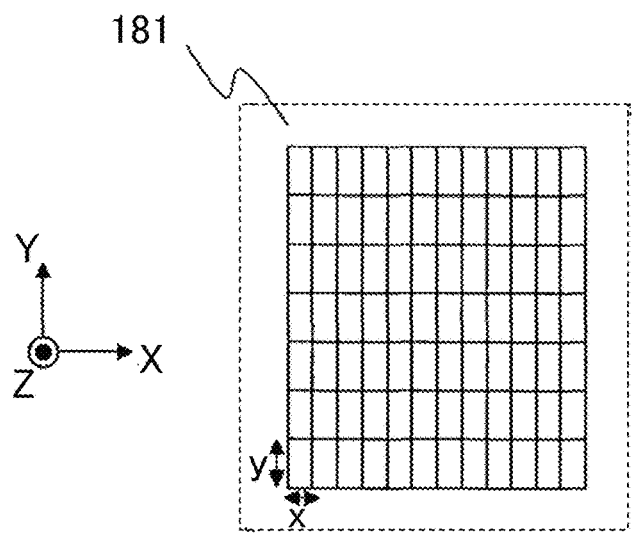
FIGS. 7A to 7C illustrate a relationship between an effective area and a light source image shape according to the third embodiment of the present invention.

FIG. 7A is a front view of the first lens surface array 181. Each lens cell in the first fly-eye lens 181 has a rectangular shape with a lateral length x and a longitudinal length y as an aspect ratio of x: y=4:9. This aspect ratio is the same as that of a divided area made by dividing the effective area with an aspect ratio of 8:9 into two equal parts by the Y-axis direction. As described above, since a condensed spot having a shape similar to each lens cell in the first lens surface array 181 is formed on the fluorescent substance 8, the condensed spot on the fluorescent substance 8 has a rectangular shape with an aspect ratio of 4:9.

Figure 7B:
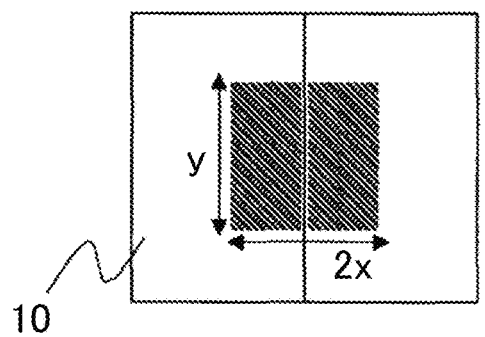

Moreover, since a condensed spot having a shape similar to that of a light emission spot of the fluorescent light on the fluorescent substance 8 is formed on each of the first reflective surface 10a and the second reflective surface 10b on the combining prism 10, the condensed spots on both reflective surfaces have a rectangular shape with an aspect ratio of 4:9. As illustrated in FIG. 7B, the two condensed spots formed near the vertex of the combining prism 10 are arranged close to each other. Hence, when these two condensed spots are combined with each other, the condensed spot on the fluorescent substance 8 has an aspect ratio of totally 2x:y=8:9 is formed near the vertex of the combining prism 10.

Figure 7C:
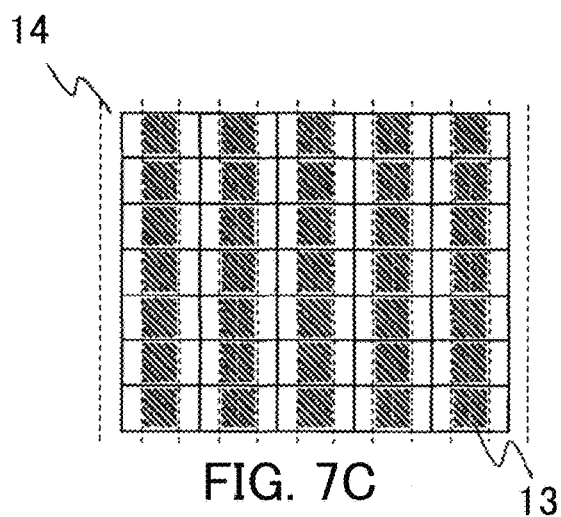

As described above, the light source image having a similar shape as that of the condensed spot formed near the vertex of the combining prism 10 is formed near the effective area. Thus, as illustrated in FIG. 7C, the effective area of the illumination optical system and the substantial light source image formed near the vertex of the combining prism 10 formed there have similar shapes, and a light loss in the effective area can be reduced and the illumination efficiency of the illumination optical system can be improved.

(Effect by Lens Array 18)

FIG. 8 illustrates an effect of the lens array 18 added in this embodiment. Upper and middle diagrams illustrate behaviors of the light (light source image) on the combining prism 10. The lower diagram illustrates a relationship between the effective area in the illustration optical system and the substantial light source image formed near the vertex of the combining prism.

Each embodiment irradiates the light from the light source 1 onto the fluorescent substance without using the lens array 18, and thus the light density increases as the output of the laser beam from the light source increases and the light conversion efficiency in the fluorescent substance 8 lowers due to the luminance saturation phenomenon. In order to reduce the drop of the light conversion efficiency, for example, it is conceivable to provide a diffusion element between the concave lens 5 and the dichroic mirror 6.

When the condensed spot by the laser beam from the light source 1 is blurred and formed with the diffusion element, the light density has a circular spatial distribution shape, as illustrated in FIGS. 8A and 8B, and the light density is nonuniform distribution like a Gaussian distribution. When light fluxes from the two light source units are combined near the vertex of the combining prism 10, the condensed spot spatially widely spreads. Thus, an attempt to closely arrange the condensed spots as illustrated in FIG. 8A prevents partial light from being reflected on the reflective surface of the combining prism and causes a loss.

On the other hand, an attempt to distantly arrange the two condensed spots so as to reduce a loss on the combining prism 10 as illustrated in FIG. 8B causes the light loss to increase because the light source images are separate from each other on the effective area in the illumination optical system and a light amount outside the effective area increases. The effective area in each embodiment of the present invention has an approximately square shape with an aspect ratio of about 8:9, and the combined light source image as a whole becomes longer in the X-axis direction when the light source has a circular shape. As a result, even if the light source image falls within the effective area in the Y-axis direction, the light outside the effective area increases in the X-axis direction and the light loss increases.

Accordingly, when the condensed spot is formed on the fluorescent substance 8 using the lens array 18 as described above, the condensed spot near the vertex of the combining prism 10 can be arbitrarily shaped by adjusting a shape of each lens cell in the first lens surface array 181. Moreover, this configuration can reduce the influence by the luminance saturation phenomenon where the light density of the condensed spot has a uniform distribution.

As a result, as illustrated in the middle diagram in FIG. 8C, the light loss in the combining prism 10 can be reduced in comparison with the case of FIG. 8A, even when the two condensed spots are closely arranged. As illustrated in the rightmost diagram in FIG. 8C, the light source image has a shape similar to the effective area and can be easily formed in the effective area.

(Comparison Between Use of Diffusion Element and Use of Lens Array 18)

According to the researches by the instant inventors, when the diffusion element and the two light source units are used as illustrated in FIGS. 8A and 8B, the brightness becomes about 1.3 times as high as that with one light source. On the other hand, as illustrated in FIG. 8C, when the lens array 18 and the two light source units are used, the brightness becomes about 1.8 times as high as that with one light source unit.

Illustrative Embodiment

As described above, a combination of the two condensed spots has a shape similar to that of the effective area is formed near the vertex of the combining prism 10. The illumination apparatus may satisfy the following condition.

Assume that the effective area may be set to a predetermined area in an area in which a plurality of light source images is formed by the illumination optical system C using the light from the optical path combining system B. Alternatively, the effective area may be set to an area in which the polarization direction of the light from the optical path combining system B is converted into the predetermined polarization direction in the incident surface of the polarization conversion element 14. More specifically, the effective area may be set to each area corresponding to the plurality lens cells in the second fly-eye lens 13 in the area in which the polarization direction of the light is converted into the predetermined polarization direction.

Assume that N is the number of light source units. When the effective area is divided into N segments along at least one of a first side and a second side orthogonal to the first side of the effective area, X is a short side of the segment and Y is a long side of the segment. Moreover, x is a short side of each lens cell (first lens surface) in the first lens surface array 181, and y is a long side of each lens cell in the first lens surface array 181. Then, the illumination apparatus may satisfy the following condition.

$$0.7 \leq \frac{X}{Y} \cdot \frac{y}{x} \leq 1.3 \tag{2}$$

This conditional expression (2) means that the shape of the area made by dividing the effective area by the number of light source units is approximately similar to the shape of the light source image. When this condition is satisfied, the brightness with two light source units can become about 1.4 times as high as that with one light source unit. The lower limit and the upper limit of the conditional expression (2) may be changed, so that the multiplication term can be from 0.8 to 1.2 inclusive or from 0.9 to 1.1 inclusive.

Fourth Embodiment

Figure 10:
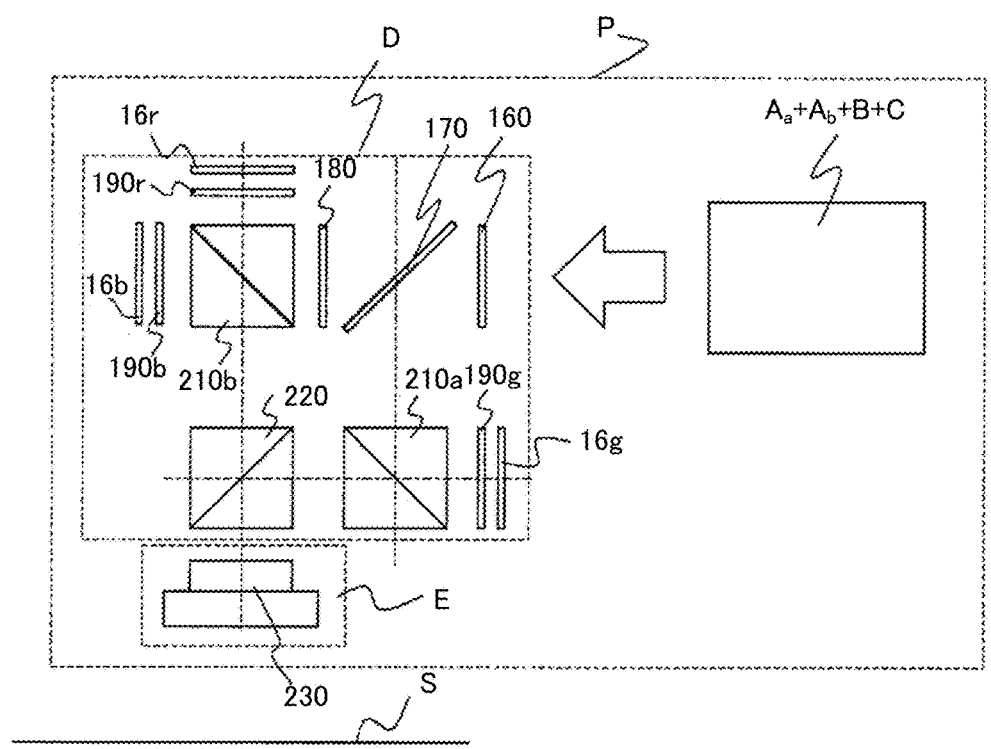
FIG. 10 illustrates a configuration of an illumination apparatus of a projection type display apparatus that includes the illumination apparatus according to each embodiment.

Referring to FIG. 10, a description will be given of a configuration of the projection type display apparatus according to a fourth embodiment of the present invention that can be mounted with the illumination apparatus according to each of previously described embodiments.

(Configuration of Projection Type Display Apparatus P)

A projection type display apparatus P includes, as illustrated in FIG. 10, an illumination apparatus that includes a first light source unit $A_a$, a second light source unit $A_b$, an optical path combining system B, and an illumination optical system C, a color separating and combining system D, and a projection optical system E. The illumination apparatus is configured as described above, and thus the configurations of the color separating and combining system D and the projection optical system E will be now described.

(Configuration of the Color Separating and Combining System)

A light flux from the condenser lens 15 in the illumination optical system C enters the color separating and combining system D illustrated in FIG. 10. The color separating and combining system D includes a polarization plate 160, a dichroic mirror 170, a wavelength selective phase difference plate 180, a red quarter waveplate (quarter waveplate for red) 190r, a green quarter waveplate (quarter waveplate for green) 190g, a blue quarter waveplate (quarter waveplate for blue) 190b, a first polarization beam splitter 210a, a second polarization beam splitter 210b, and a combining prism 220. The red quarter waveplate 190r, the green quarter waveplate 190g, and the blue quarter waveplate 190b will be collectively referred to as a quarter waveplate 190.

The thus-configured color separating and combining system D introduces a light flux from the illumination optical system C to the light modulation element 16 or the light modulation elements for the first color light, the second color light, and the third color light which are different from one another, more specifically, a red liquid crystal panel 16r (first light modulation element), a green liquid crystal panel 16g (second light modulation element), and a blue liquid crystal panel 16b (third light modulation element). Moreover, it receives a light flux from the light modulation element 16 and guides it to the projection optical system E, which will be described later.

The polarization plate 160 transmits only light having the uniform, predetermined polarization direction made by the polarization conversion element 14. The dichroic mirror 170 guides the blue light and the red light in the light from the polarization plate 160 to the second polarization beam splitter 210b, and guides the blue light to the first polarization beam splitter 210a.

The first polarization beam splitter 210a and the second polarization beam splitter 210b guide the light from the dichroic mirror 170 to the light modulation element 16 in accordance with the polarization direction, and guides the light from the light modulation element 16 to the combining prism 220. The quarter waveplate 19 serves to provide a phase difference of λ/2 to the reciprocation of the reflection on the light modulation element 16, and to improve the light detection effect.

The combining prism 220 combines the blue light and the red light from the second polarization beam splitter 210a with the green light from the second polarization beam splitter 210b, and guides the combined light to the projection optical system E.

(Configuration of Projection Optical System)

The projection optical system E includes a projection lens 230, and guides the light from the color separating and combining system D to a target plane S. The projection lens 230 may be attached to and detached from the projection type display apparatus P illustrated in FIG. 10, and the projection optical system E may include a shift unit configured to shift the projection lens 230 in a direction orthogonal to the optical axis. This configuration enables the projection type display apparatus P to display an image on the target plane S.

Fifth Embodiment

Figure 11:
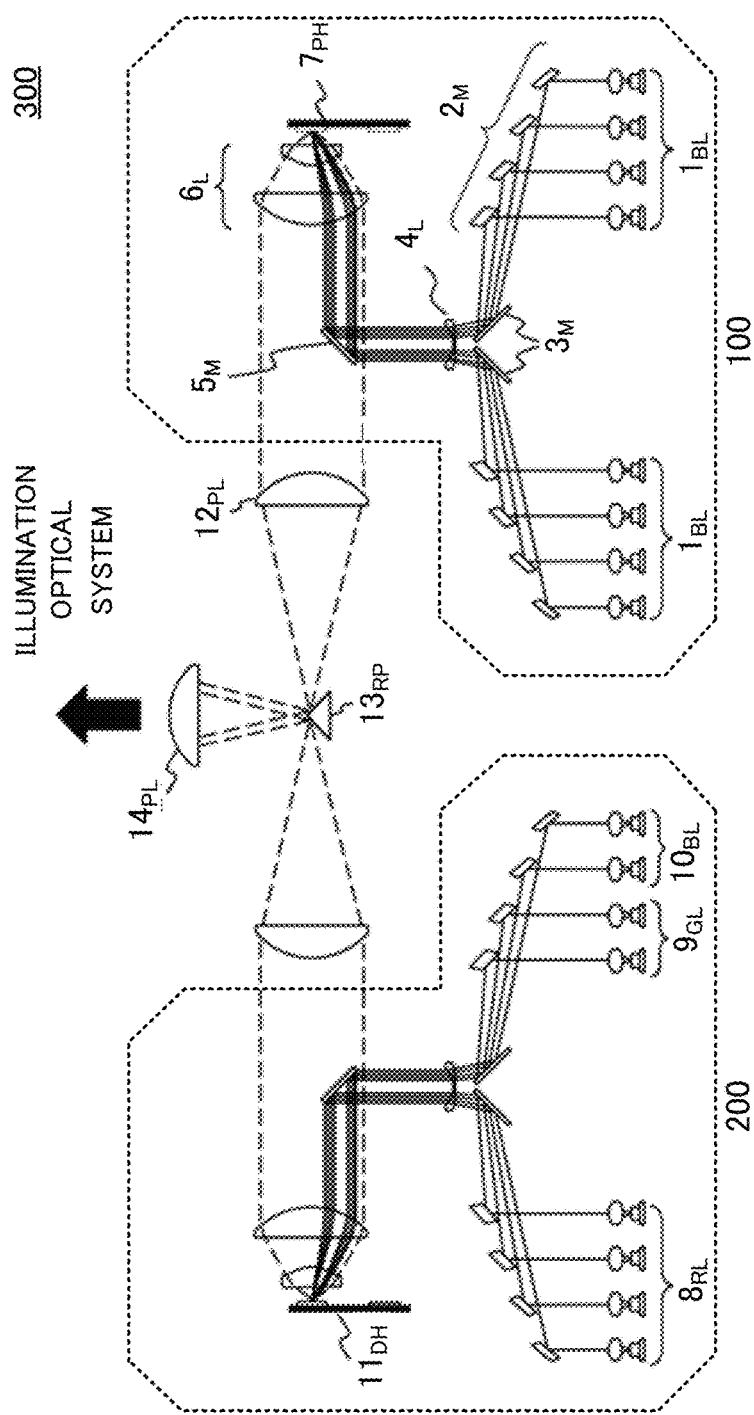
FIG. 11 illustrates a configuration of a light source apparatus according to a fourth embodiment.

Referring now to FIG. 11, a description will be given of a light source apparatus according to a fifth embodiment of the present invention. FIG. 11 is a structural view of a light source apparatus 300 according to this embodiment. The light source apparatus 300 includes two light source units 100 and 200, and combines exit light fluxes from the light source units 100 and 200, and emits the combined exit light. A description will now be given of the exit light fluxes from the light sources to the combined exit light from the light source.

Initially, a description will be given of the light source unit (first light source unit) 100. The light source unit 100 includes a plurality of laser diodes $1_{BL}$ each configured to emit the excitation light (excitation light source, first solid-state light source). In this embodiment, the laser diode $1_{BL}$ is a blue laser diode configured to emit blue wavelength band light having a wavelength of 455 nm. However, this embodiment is not limited to this example, and another light source may be used, such as an ultraviolet laser diode, as long as the light source emits the excitation light. Each of the plurality of laser diodes $1_{BL}$ includes a collimator lens configured to collimate each exit light, and each exit light becomes approximately parallel light exiting in the upper direction in FIG. 11.

The approximately parallel light exiting from the laser diode $1_{BL}$ is condensed and reflected by mirror units $2_M$. A reflection mirror $3_M$ condenses laser beams condensed on both sides (left and right sides in FIG. 11) on a focus position of a concave lens $4_L$. The concave lens $4_L$ approximately collimates the condensed light and guides the collimated light to a mirror $5_M$. The light reflected on the mirror $5_M$ is condensed on a fluorescent wheel $7_{PH}$ by a condenser lens $6_L$ (condenser lens unit). The fluorescent wheel $7_{PH}$ includes a wavelength conversion element (such as a fluorescent substance) configured to convert excitation light into light having a longer wavelength than that of the excitation wavelength. The fluorescent wheel $7_{PH}$ is made by applying the fluorescent powder (fluorescent substance) on the circumference on the surface of the metal substrate, and can be rotated by an unillustrated motor. The condensed excited light is reflected and converted into the fluorescent light with a different wavelength by the fluorescent substance, and again enters the condensed lens $6_L$. The condenser lens $6_L$ approximately collimates the fluorescent light, and emits it from the light source unit 100. In this embodiment, the fluorescent wheel $7_{PH}$ converts the excitation light into the yellow wavelength band light (or emits the yellow fluorescent light). However, this embodiment is not limited to this example, and the fluorescent wheel $7_{PH}$ may convert the excitation light into another wavelength band light, such as green wavelength band light. In this case, the fluorescent wheel $7_{PH}$ may emit fluorescent light (such as green fluorescent light) other than yellow.

Figure 12:
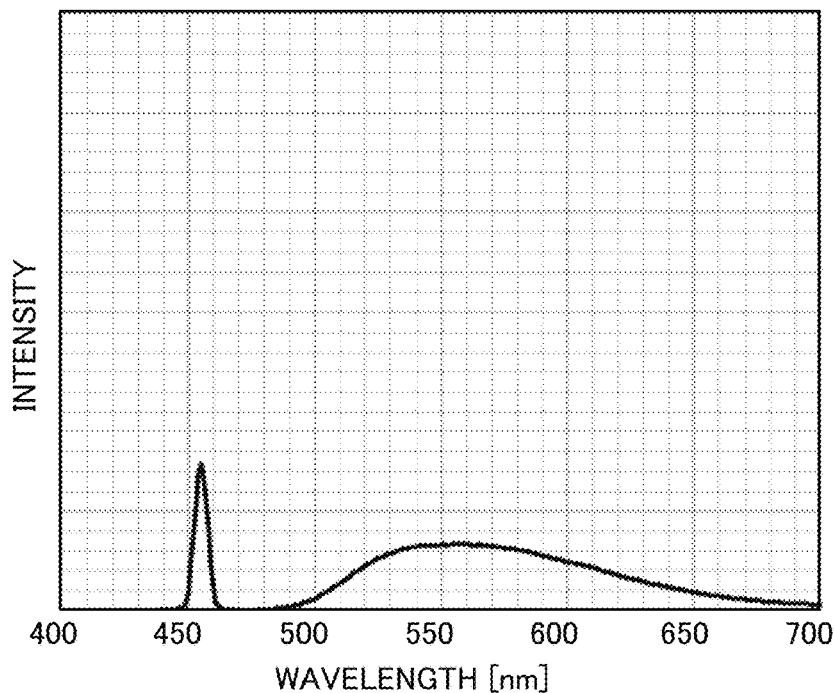
FIG. 12 illustrates a wavelength spectrum of light emitted from a first light source unit according to the fourth embodiment.

FIG. 12 illustrates a wavelength spectrum of the light emitted from the light source unit 100. In FIG. 12, an abscissa axis denotes a wavelength, and an ordinate axis denotes an intensity. In this embodiment, the laser diode $1_{BL}$ used as the excitation light source is a blue laser diode that emits the excitation light having a wavelength of 455 nm. The yellow fluorescent substance having a peak wavelength around 550 nm to 560 nm is applied on the fluorescent wheel $7_{PH}$. The exit light from the light source unit 100 contains the unconverted excitation light that is not converted into the fluorescent light (excitation light itself emitted from the laser diode $1_{BL}$) in addition to the yellow fluorescent light. Thus, as illustrated in FIG. 12, a steep (sharp) spectrum having a peak intensity of 455 nm and a smooth spectrum having a peak intensity from 550 nm to 560 nm are obtained.

A description will now be given of the light source unit 200 (second light source unit). The light source unit 200 is similar to the light source unit 100 in the basic optical configuration, such as an arrangement of a lens and a mirror. The light source unit 200 is disposed opposite to the light source unit 100. A description will now be given of the light source unit 200 about a difference from the light source unit 100. A description of those elements in the light source unit 200, which are corresponding elements in the light source unit 100, will be omitted.

In this embodiment, the light source unit 200 includes, as an excitation light source, three types of laser diodes, such as a red laser diode $8_{RL}$ (second solid-state light source), a green laser diode $9_{GL}$ (third solid-state light source), and a blue laser diode $10_{BL}$. The red laser diode $8_{RL}$ emits the red wavelength band light. The green laser diode $9_{GL}$ emits the green wavelength band light. The blue laser diode $10_{BL}$ emits the blue wavelength band light. For each laser, the excitation light is emitted as parallel light on the upper side in FIG. 11, and condensed by a diffusive wheel $11_{DH}$ by the optical system similar to the light source unit 100.

The diffusive wheel $11_{DH}$ is a light diffusion element configured to diffuse the red wavelength band light, the green wavelength band light, and the blue wavelength band light emitted from the red laser diode $8_{RL}$, the green laser diode $9_{GL}$, and the blue laser diode $10_{BL}$. The diffusive wheel $11_{DH}$ is located at the position corresponding to the fluorescent wheel $7_{PH}$ in the light source unit 100 in the light source unit 200 (or the position corresponding to the fluorescent wheel $7_{PH}$). The diffusive wheel $11_{DH}$ is made by applying white powder, such as barium sulfate, on a metal substrate, and diffusively reflects the incident laser beam. The diffusive wheel $11_{DH}$ can be rotated by an unillustrated motor, and when each laser diode is used as the excitation light source the diffusive wheel $11_{DH}$ can serve to average by time and reduce the peculiar uneven luminance (speckle) that occurs in the light projected on the screen. The light reflected on the diffusive wheel $11_{DH}$ is collimated by the condenser lens and emitted from the light source unit 200.

Figure 13:
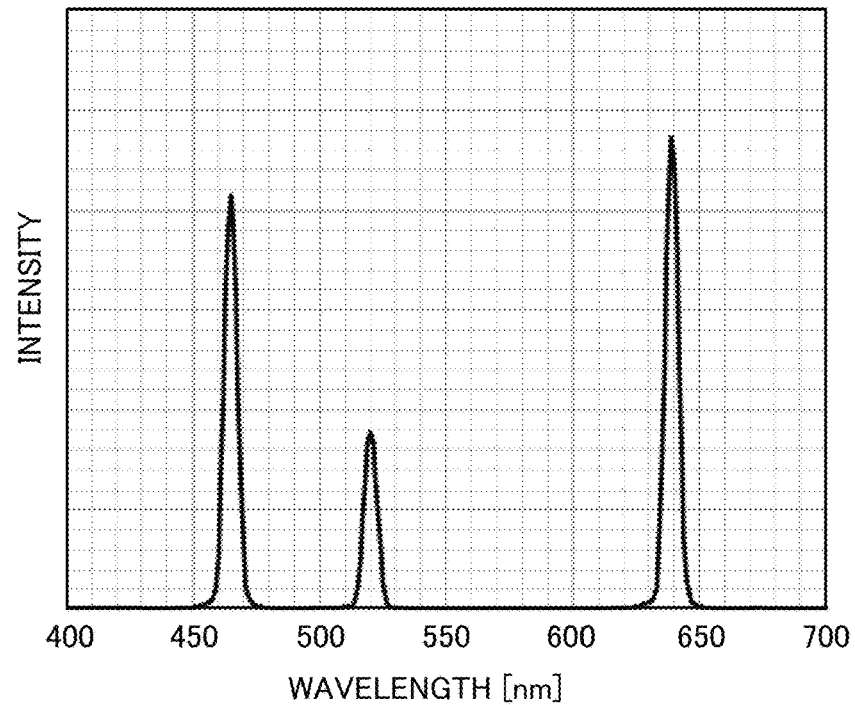
FIG. 13 illustrates a wavelength spectrum of light emitted from a second light source unit according to the fourth embodiment.

FIG. 13 illustrates a wavelength spectrum of light emitted from the light source unit 200. In FIG. 13, an abscissa axis denotes a wavelength, and an ordinate axis denotes an intensity. The blue laser diode $10_{BL}$ has a central wavelength of 465 nm. The blue laser diode $10_{BL}$ has a higher light conversion efficiency as a light emitting wavelength is shorter, but the light is violetish blue. Thus, a light source that excites the fluorescent substance uses a laser diode $1_{BL}$ with a short wavelength (blue laser diode), whereas the blue laser diode $10_{BL}$ uses a blue laser diode having a long wavelength in order to display the blue color suitable for the image. The green laser diode $9_{GL}$ has a central wavelength of about 520 nm. The green laser diode $9_{GL}$ may actually have a wavelength of about 535 nm to 540 nm, but it is difficult to exhibit sufficient performance in efficiency and life. On the other hand, when the green laser diode $9_{GL}$ having a wavelength of 520 nm is used, the green color in this case is not suitable for the image light. In particular, when the yellow is expressed and displayed by combining the red with the green, the generated yellow is whitish and the image expressing ability degrades. The red laser diode $8_{RL}$ has a central wavelength of about 638 nm. Thus, as illustrated in FIG. 13, a steep (sharp) spectrum with peak intensities at 465 nm, 520 nm, and 638 nm is obtained.

The light fluxes emitted from the light source units 100 and 200 are condensed by corresponding positive lenses $12_{PL}$, and form light source images on a reflective prism $13_{RP}$. The reflective prism $13_{RP}$ guides the exit light fluxes from the light source units 100 and 200 in the same direction (upper direction in FIG. 11). The light fluxes reflected and combined by the reflective prism $13_{RP}$ are approximately collimated by a positive lens $14_{PL}$ and guided to the illumination optical system.

Figure 14:
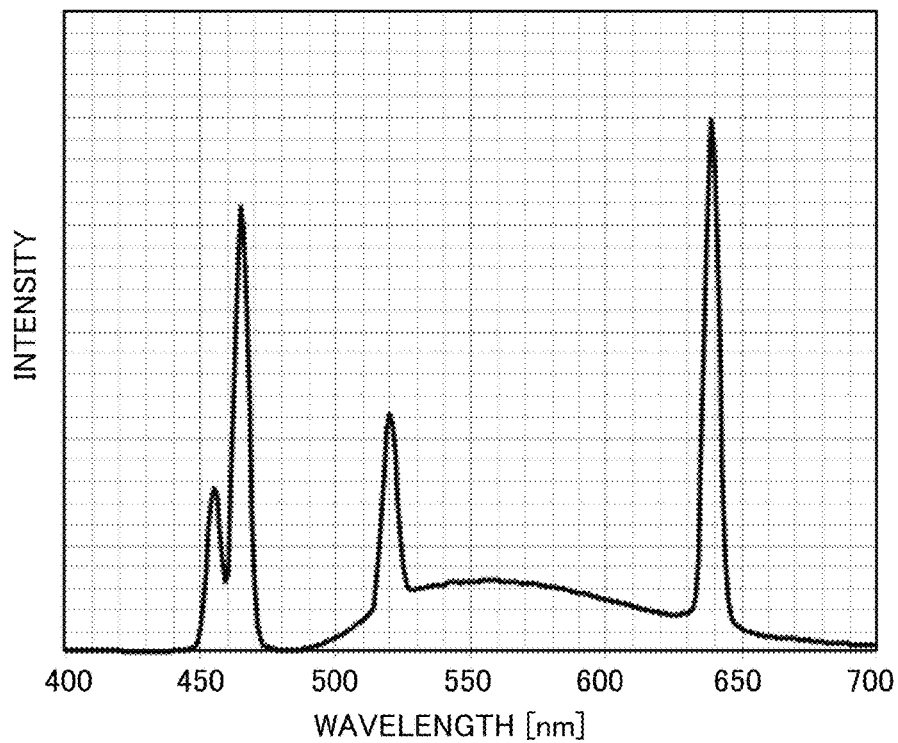
FIG. 14 illustrates a wavelength spectrum of light emitted from the light source apparatus according to the fourth embodiment.

FIG. 14 illustrates a wavelength spectrum of the combined light flux emitted from the light source apparatus 300 (positive lens $14_{PL}$). In FIG. 14, an abscissa axis denotes a wavelength, and an ordinate axis denotes an intensity. The combined light flux is separated by the subsequent illumination optical system into three primary colors, and forms a color image by each color image display device (such as a liquid crystal panel). The color image is projected onto the screen.

Figure 15:
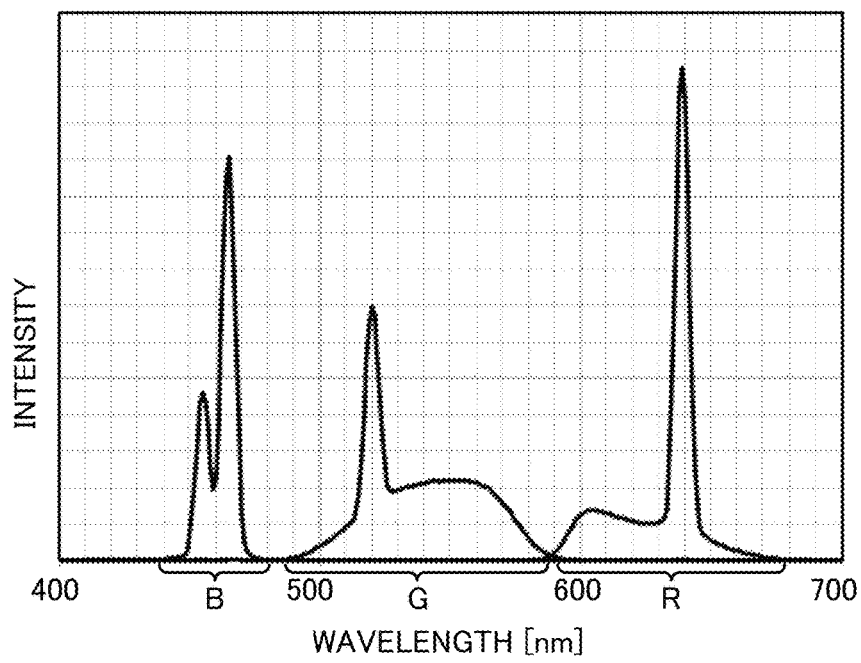
FIG. 15 illustrates a wavelength spectrum of light projected by a projection type display apparatus according to the fourth embodiment.
Figure 16:
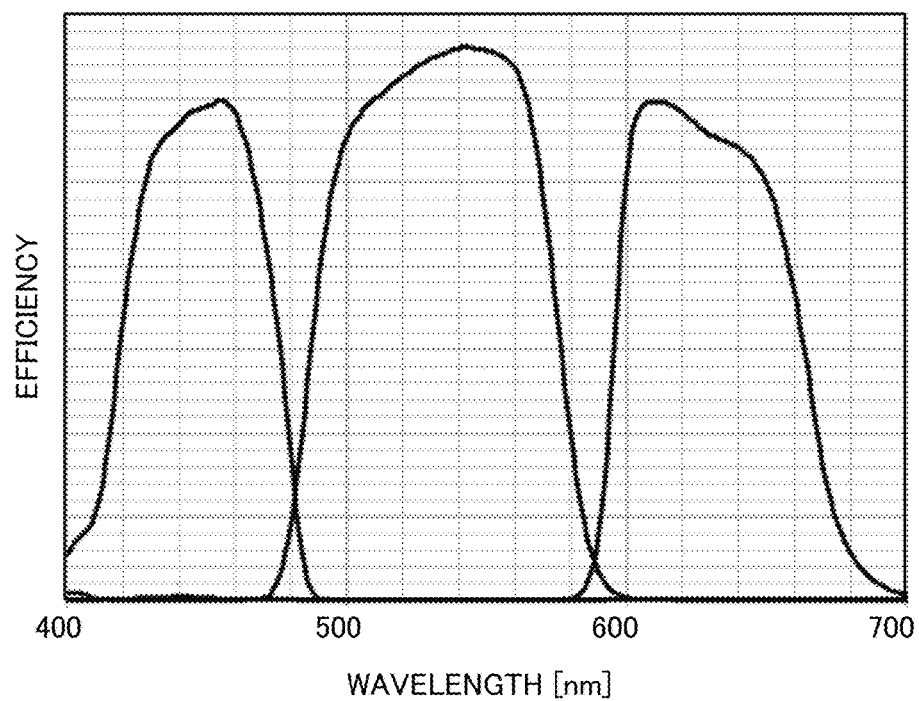
FIG. 16 illustrates a light utilization efficiency for each wavelength of a color separating and combining system according to the fourth embodiment.

FIG. 16 illustrates a light utilization efficiency for each wavelength of the color separating and combining system in the illumination optical system. In FIG. 16, an abscissa axis denotes a wavelength, and an ordinate axis denotes an efficiency (light utilization efficiency). When each color optical path has an efficiency characterized as illustrated in FIG. 16, the spectrum of the projected image has a characteristic as illustrated in FIG. 15. FIG. 15 illustrates a wavelength spectrum of the light (projected image) projected by the projection type display apparatus including the light source apparatus 300. In FIG. 15, an abscissa axis denotes a wavelength, and an ordinate axis denotes an intensity. According to the configuration of this embodiment, a broadband color reproduction range can be realized as illustrated in FIG. 15. The blue light, as described above, has peak intensities with two wavelengths of 455 nm and 465 nm. The blue light has a dominant wavelength of 465 nm, and the required blue light can be thus expressed. The spectrum of the green light is obtained by combining the green light with a wavelength of 520 nm with the fluorescent light. As described above, it is difficult to express the required green only with the green laser diode $9_{GL}$ having a wavelength of 520 nm. On the other hand, the green made by separating the fluorescent light needs to significantly cut a spectrum and the efficiency lowers, in order to express the green with a high color purity (high value in the y coordinate in the chromaticity diagram). Accordingly, this embodiment improves the color purity using the green laser diode $9_{GL}$ with a single wavelength, combines the green laser beam with the fluorescent light, corrects the color coordinate, and provide intended green light with a high efficiency. A spectrum for the red light is also obtained by combining the red light from the red light diode $8_{RL}$ with the fluorescent light. Since the red laser diode $8_{RL}$ cannot realize a high light output, it is difficult to use it for a high luminance projection type display apparatus. Accordingly, this embodiment combines the red light with the fluorescent light, realizes a high color purity that cannot be achieved by the red fluorescent light, and prevents the increased number of low-output red laser diodes.

When a broad color reproduction range is created with a required monochromatic chromaticity as described above, the significant unbalance in the three primary colors deteriorates the combined white color and degrades the display image. In particular, when the green color has a high color purity, white is likely greenish and it is necessary to properly balance each color light from the laser diode with the fluorescent light.

Figure 17:
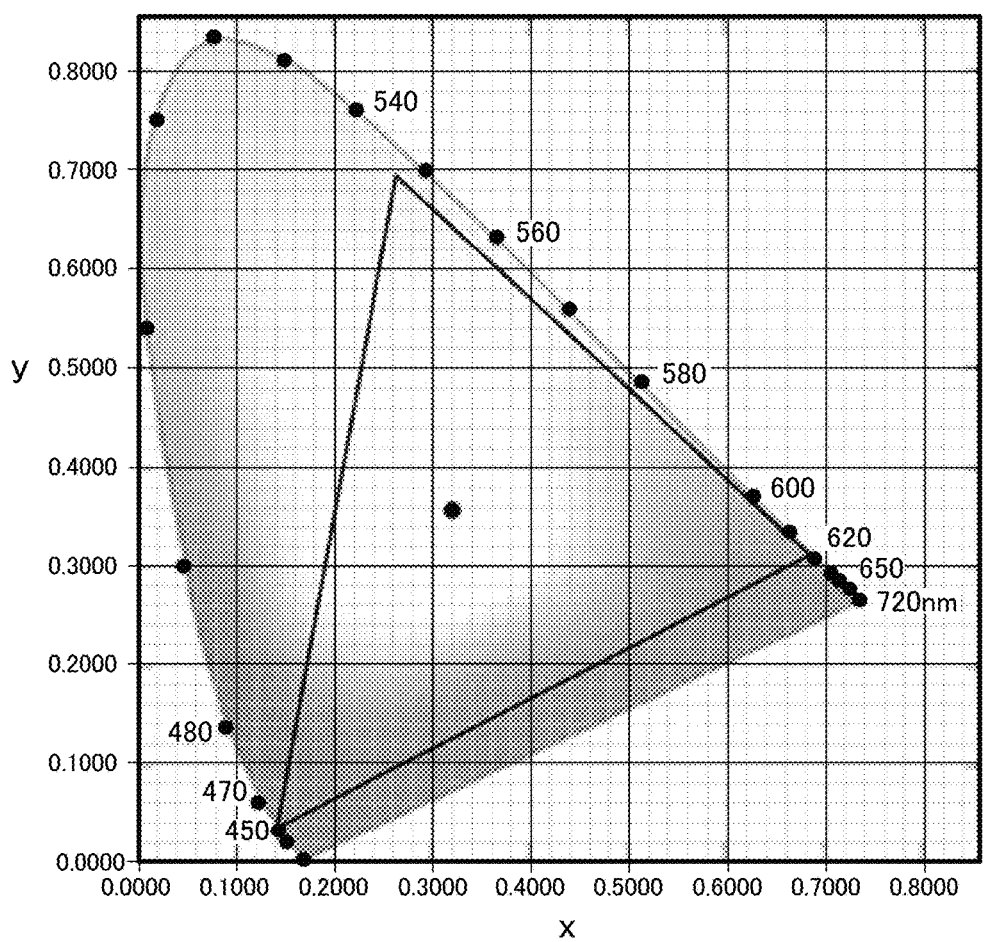
FIG. 17 illustrates a color reproduction range and a white chromaticity of the projection type display apparatus according to the fourth embodiment.

FIG. 17 is an explanatory view of the color reproduction range and white chromaticity in the projection type display apparatus. This embodiment illustrates the white chromaticity by a black dot "•" in FIG. 17, and can realize high quality white reproduction. In order to reconcile the broad color reproduction range with the high quality white reproduction, this embodiment adjusts light outputs Pe and Pr from the respective light sources so as to satisfy the following conditional expression (3), where Pe is a light output from the laser diode $1_{BL}$ (excitation light source) and Pr is a light output from the red laser diode $8_{RL}$.

$$Pe > Pr \tag{3}$$

The light outputs Pr and Pg from the corresponding light sources may be adjusted so as to satisfy the following conditional expression (4) where Pg is a light output of the green laser diode $9_{GL}$.

$$Pr > Pg \tag{4}$$

The light outputs Pe, Pr, and Pg from the corresponding light sources may be adjusted so as to satisfy the following conditional expressions (5), (6), and (7).

$$Pe > Pr \times 2 \tag{5}$$

$$Pe > Pg \times 3 \tag{6}$$

$$Pr > Pg \times 1.5 \tag{7}$$

The light outputs Pe, Pr, and Pg from the corresponding light sources may be adjusted so as to satisfy the following conditional expressions (5'), (6'), and (7').

$$Pr \times 6 > Pe > Pr \times 2 \tag{5'}$$

$$Pg \times 10 > Pe > Pg \times 3 \tag{6'}$$

$$Pg \times 5.0 > Pr > Pg \times 1.5 \tag{7'}$$

When these conditional expressions are not satisfied, the color balance for white generated by combining the three primary colors destroys and the white becomes unsuitable. The following conditional expression (8) may be satisfied where Pb is a light output of the blue laser diode $10_{BL}$.

$$Pe > Pb \qquad (8)$$

As one illustrative light output from each light source, the light output Pe from the laser diode $1_{BL}$ (excitation light source) is set to 80 W, the light output Pr from the red laser diode $8_{RL}$ is set to 16 W, the light output Pg from the green laser diode $9_{GL}$ is set to 9 W, and the light output Pb from the blue laser diode $10_{BL}$ is set to 14 W. This light output balance can reconcile the broad color reproduction range with the high quality white reproduction. When there are provided a plurality of laser diodes $1_{BL}$, a plurality of red laser diodes $8_{RL}$, and a plurality of green laser diodes $9_{GL}$, each of the light outputs Pe, Pr, and Pg is a sum of corresponding light outputs from the plurality of solid-state light sources (laser diodes).

Sixth Embodiment

Figure 18:
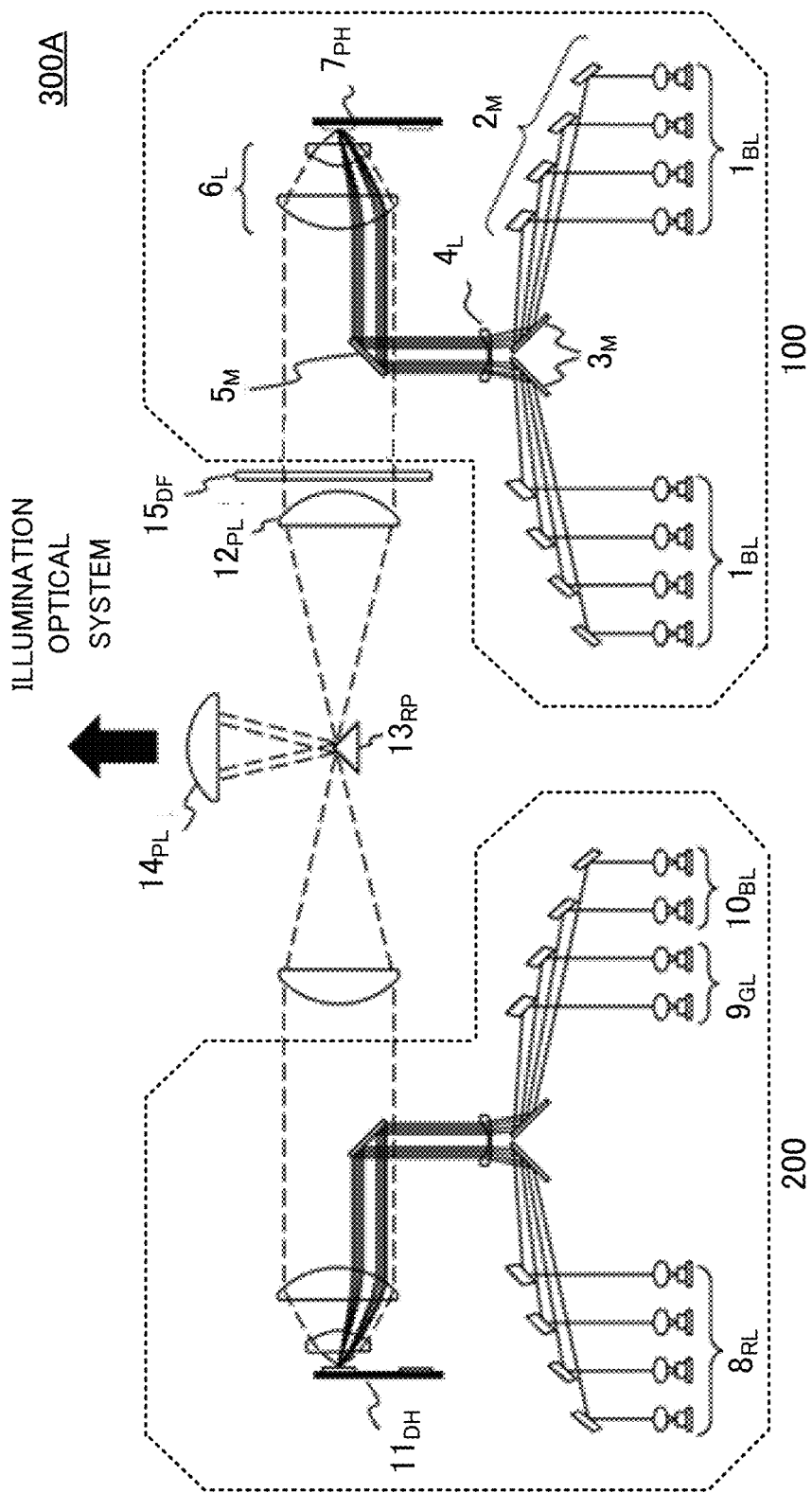
FIG. 18 illustrates a configuration of a light source apparatus according to a fifth embodiment.

Referring now to FIG. 18, a description will be given of a light source apparatus according to a sixth embodiment of the present invention. FIG. 18 illustrates a configuration of a light source apparatus 300A according to this embodiment. The light source apparatus 300A is different from the light source apparatus 300 according to the fifth embodiment described with reference to FIG. 11 in that the light source apparatus 300A includes a dichroic filter $15_{DF}$ (filter) at an exit (on the exit side or output side) of the light source unit 100. The other configuration of the light source apparatus 300A is similar to that of the light source apparatus 300, and a description thereof will be omitted.

The dichroic filter $15_{DF}$ can filter or reduce (attenuate) a cyanic band that contains a wavelength from 490 nm to 500 nm inclusive and an orange band that contains a wavelength from 580 nm to 590 nm inclusive (specific wavelength band). Thus, the dichroic filter $15_{DF}$ can filter the color components of the cyanic band and the orange band from the fluorescent light (yellow fluorescent light).

Figure 19:
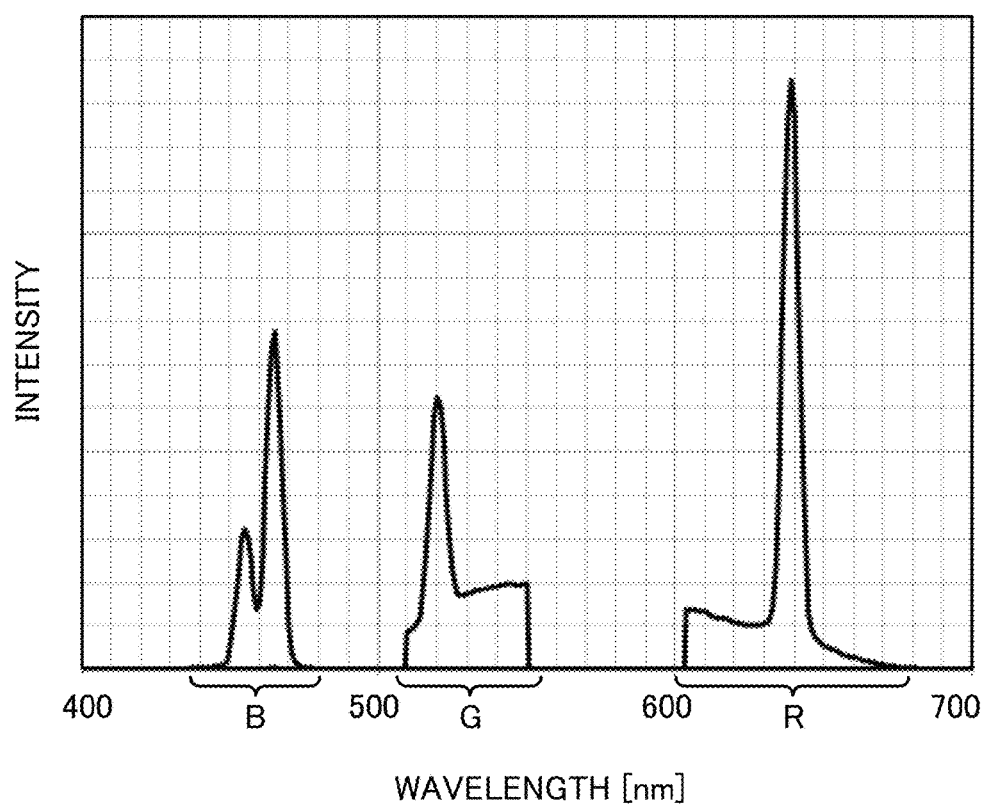
FIG. 19 illustrates a wavelength spectrum of light projected by a projection type display apparatus according to the fifth embodiment.

FIG. 19 is a wavelength spectrum projected by the projection type display apparatus that includes the light source apparatus 300A. The light source apparatus 300A that includes the dichroic filter $15_{DF}$ between the exit of the light source unit 100 and the positive lens $12_{PL}$ can provide a characteristic illustrated in FIG. 19. The dichroic filter $15_{DF}$ according to this embodiment is a filter having a characteristic of filtering the wavelength band from 480 nm to 510 nm inclusive and the wavelength band from 550 nm to 603 nm inclusive from the light flux to be projected by the projection type display apparatus.

Figure 20:
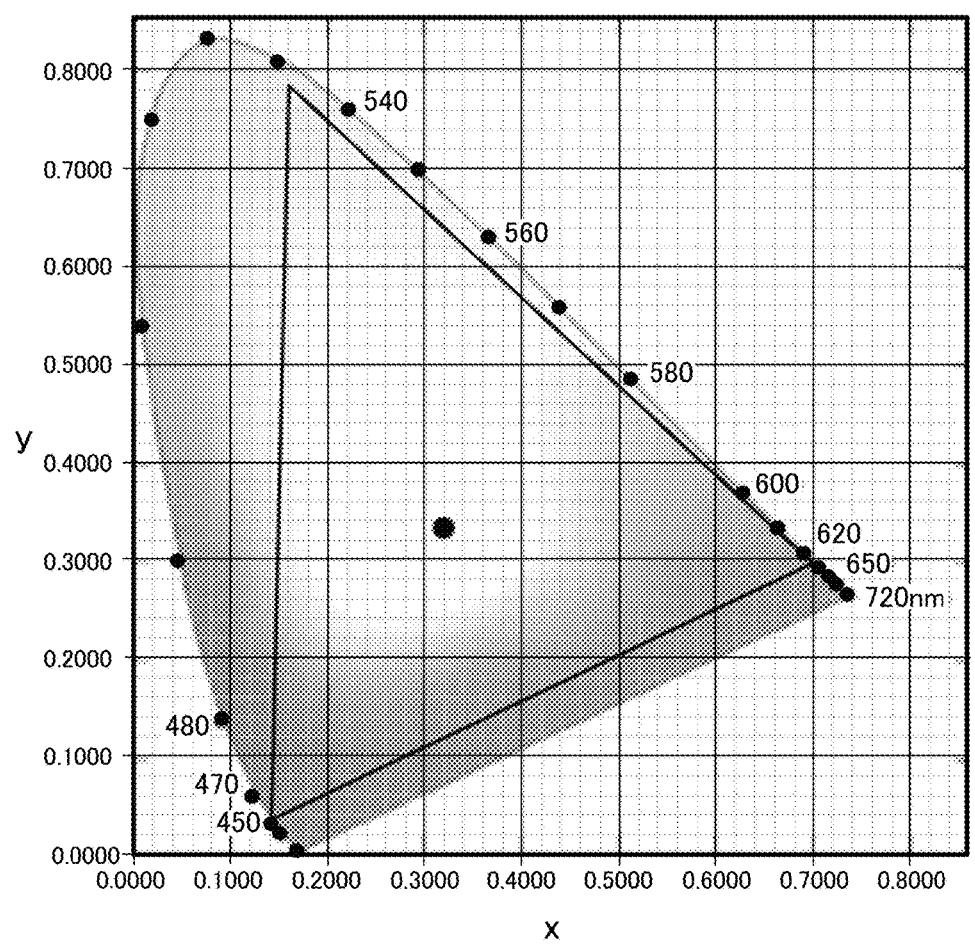
FIG. 20 illustrates a color reproduction range and a white chromaticity of the projection type display apparatus according to the fifth embodiment.

FIG. 20 is an explanatory view of the color reproduction range and white chromaticity in the projection type display apparatus that includes the light source apparatus 300A. This embodiment illustrates the white chromaticity by a black dot "•" in FIG. 20, and realizes the high quality white. As illustrated in FIG. 20, this embodiment can provide a projection type display apparatus that covers the approximately entire visible range and display high quality white color.

The light source apparatus 300A according to this embodiment includes a filter (dichroic filter $15_{DF}$) that attenuates the specific wavelength band light in the exit light from the light source unit 100. The specific wavelength band contains at least wavelength band light between the wavelength band light emitted from the laser diode $1_{BL}$ and the red wavelength band light, but does not contain the wavelength band light emitted from the laser diode $1_{BL}$ or the red wavelength band light. The specific wavelength band light contains at least wavelength band light between the red wavelength band light (wavelength band light emitted from the red laser diode $8_{RL}$) and the green wavelength band light (wavelength band light emitted from the green laser diode $9_{GL}$), but does not contain red wavelength band light or the green wavelength band light.

This embodiment disposes the dichroic filter $15_{DF}$ at the exit of the light source unit 100 (first light source unit), but the present invention is not limited to this embodiment. The dichroic filter $15_{DF}$ may be disposed at any positions from the light source (laser diode) to the screen (target plane), as long as it serves to filter or reduce the wavelength in the cyanic band that contains a wavelength from 490 nm to 500 nm inclusive and the orange band that contains a wavelength from 580 nm to 590 nm inclusive. It is unnecessary to provide a filter that filters the wavelength in the cyanic band and a filter that filters the wavelength in orange band at the same position. For example, a function similar to that of the dichroic filter $15_{DF}$ can be realized by adjusting a cut wavelength in the dichroic mirror in the color separating and combining system in the illumination optical system.

Seventh Embodiment

Figure 21:
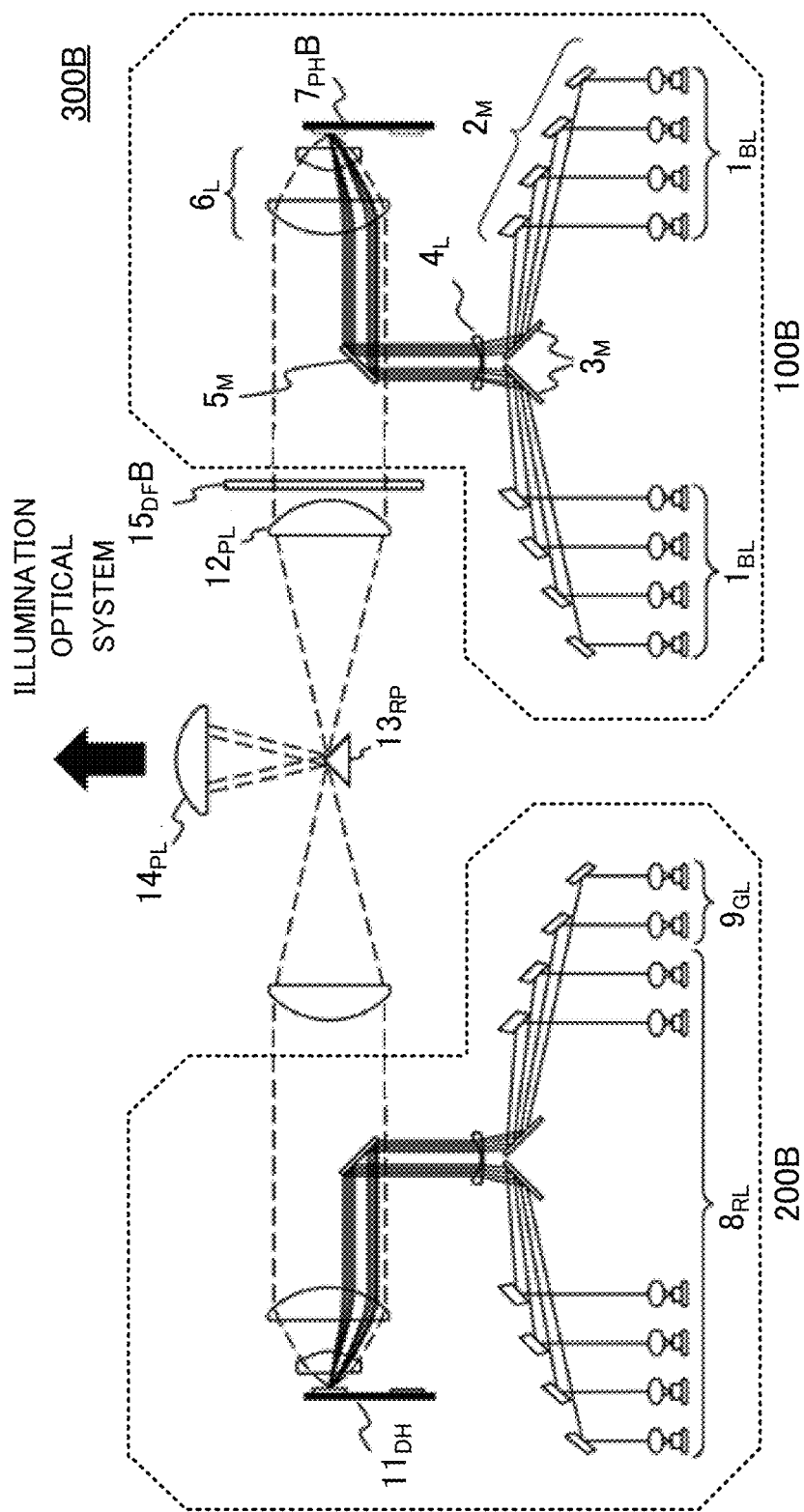
FIG. 21 illustrates a configuration of a light source apparatus according to a sixth embodiment.

Referring now to FIG. 21, a description will be given of a light source apparatus according to a seventh embodiment of the present invention. FIG. 21 is a structural diagram of a light source apparatus 300B according to this embodiment. The light source apparatus 300B includes a light source unit 100B (first light source unit) and a light source unit 200B (second light source unit).

In the light source unit 100B, a fluorescent wheel $7_{PH}$B characteristically reflects a larger amount of excitation light than that of the fluorescent wheel $7_{PH}$ according to the fifth embodiment described with reference to FIG. 18. More specifically, the fluorescent wheel $7_{PH}$B diffuses and reflects the excitation light by increasing the light density on the fluorescent substance by causing the luminance saturation, and by dropping the light conversion efficiency, or by applying a diffusive powder onto the fluorescent-powder upper layer. Since a blue light amount increases accordingly, the light source unit 200B does not include the blue laser diode $10_{BL}$. The dichroic filter $15_{DF}$B located at the exit of the light source unit 100 filters only an orange band that contains a wavelength from 580 nm to 590 nm inclusive (specific wavelength band). The other configuration of the light source apparatus 300B is similar to that of the light source apparatus 300A, and a description thereof will be omitted.

Figure 22:
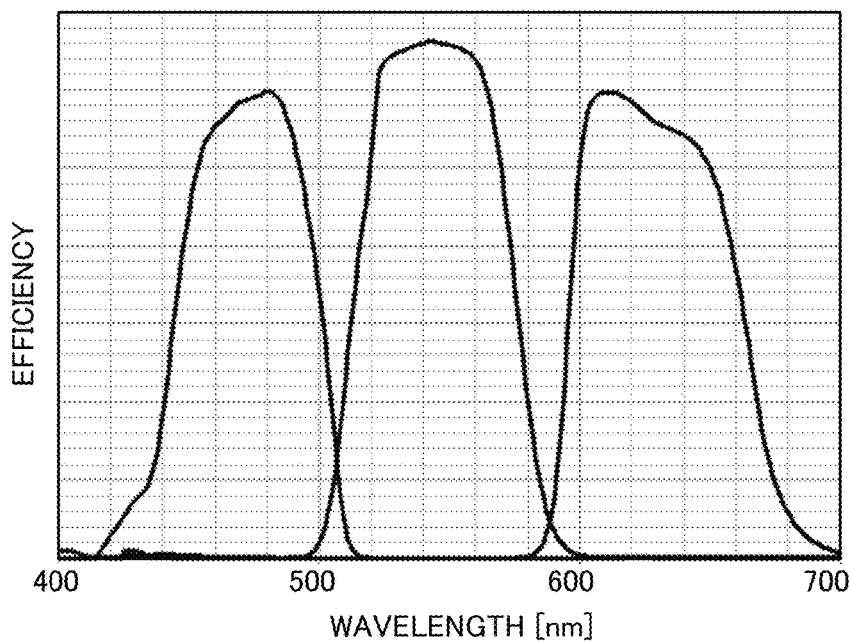
FIG. 22 illustrates a light utilization efficiency for each wavelength of a color separating and combining system according to the sixth embodiment.
Figure 23:
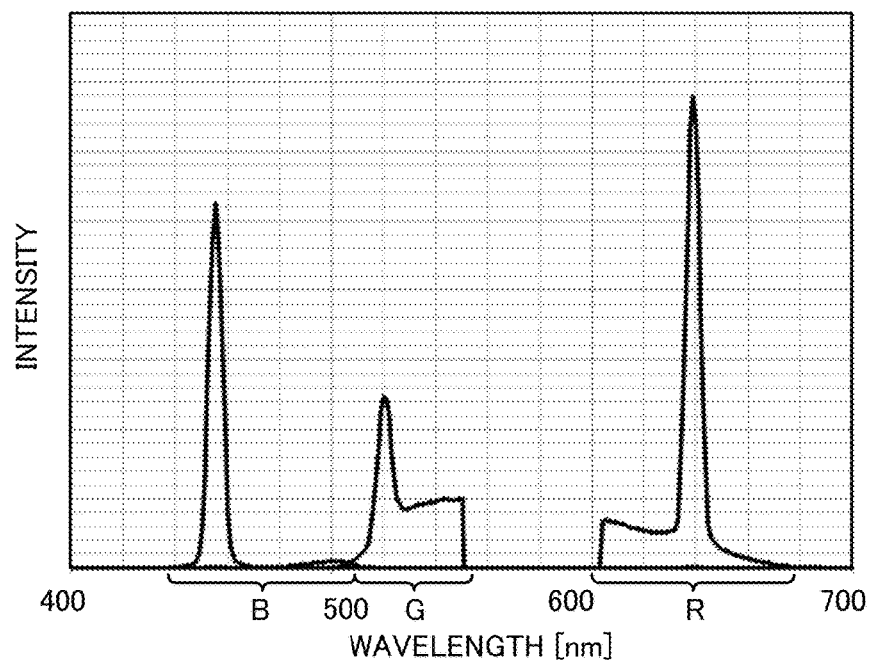
FIG. 23 illustrates a wavelength spectrum of light projected by a projection type display apparatus according to the sixth embodiment.

FIG. 22 illustrates a light utilization efficiency for each wavelength of the color separating and combining system in the illumination optical system. In FIG. 22, an abscissa axis denotes a wavelength, and an ordinate axis denotes an efficiency (light utilization efficiency). When each color optical path has an efficiency characterized as illustrated in FIG. 22, the spectrum of the projected image has a characteristic as illustrated in FIG. 23. FIG. 23 illustrates a wavelength spectrum of the light (projected image) projected by the projection type display apparatus including the light source apparatus 300B. In FIG. 23, an abscissa axis denotes a wavelength, and an ordinate axis denotes an intensity.

Figure 24:
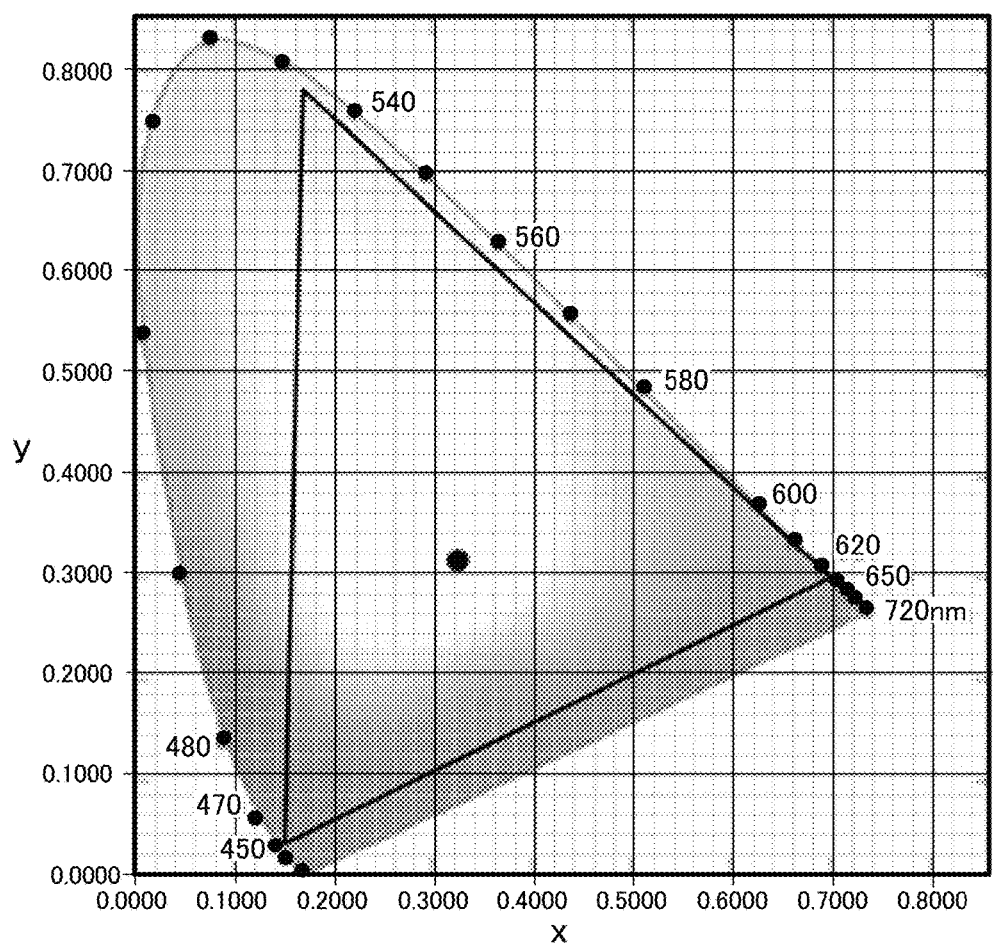
FIG. 24 illustrates a color reproduction range and a white chromaticity of the projection type display apparatus according to the sixth embodiment.

This embodiment does not include a blue laser diode $10_{BL}$ configured to emit light having a wavelength of 465 nm and to improve the blue tint, and assigns part of the spectrum of a wavelength near 500 nm of the fluorescent substance to blue as a substitute. FIG. 24 is an explanatory diagram of the color reproduction range and white chromaticity of the projection type display apparatus that includes the light source apparatus 300B. This embodiment illustrates the white chromaticity as a black dot "•" in FIG. 22, and realizes the high quality white color. As illustrated in FIG. 24, this embodiment can provide a value of the blue chromaticity equivalent with that in the projection type display apparatus according to another embodiment. This embodiment can effectively utilize the wavelength band from 480 nm to 510 nm inclusive that would be filtered in the light source apparatus 300A according to the fifth embodiment, and improve the light utilization efficiency.

As one illustrative light output of each light source, the light output Pe from the laser diode $1_{BL}$ (excitation light source) is set to 95W, the light output Pr from the red laser diode $8_{RL}$ is set to 16W, and the light output Pg from the green laser diode $9_{GL}$ is set to 6W. This light output balance can reconcile the broad color reproduction range with the high quality white color reproduction.

Eighth Embodiment

Figure 25:
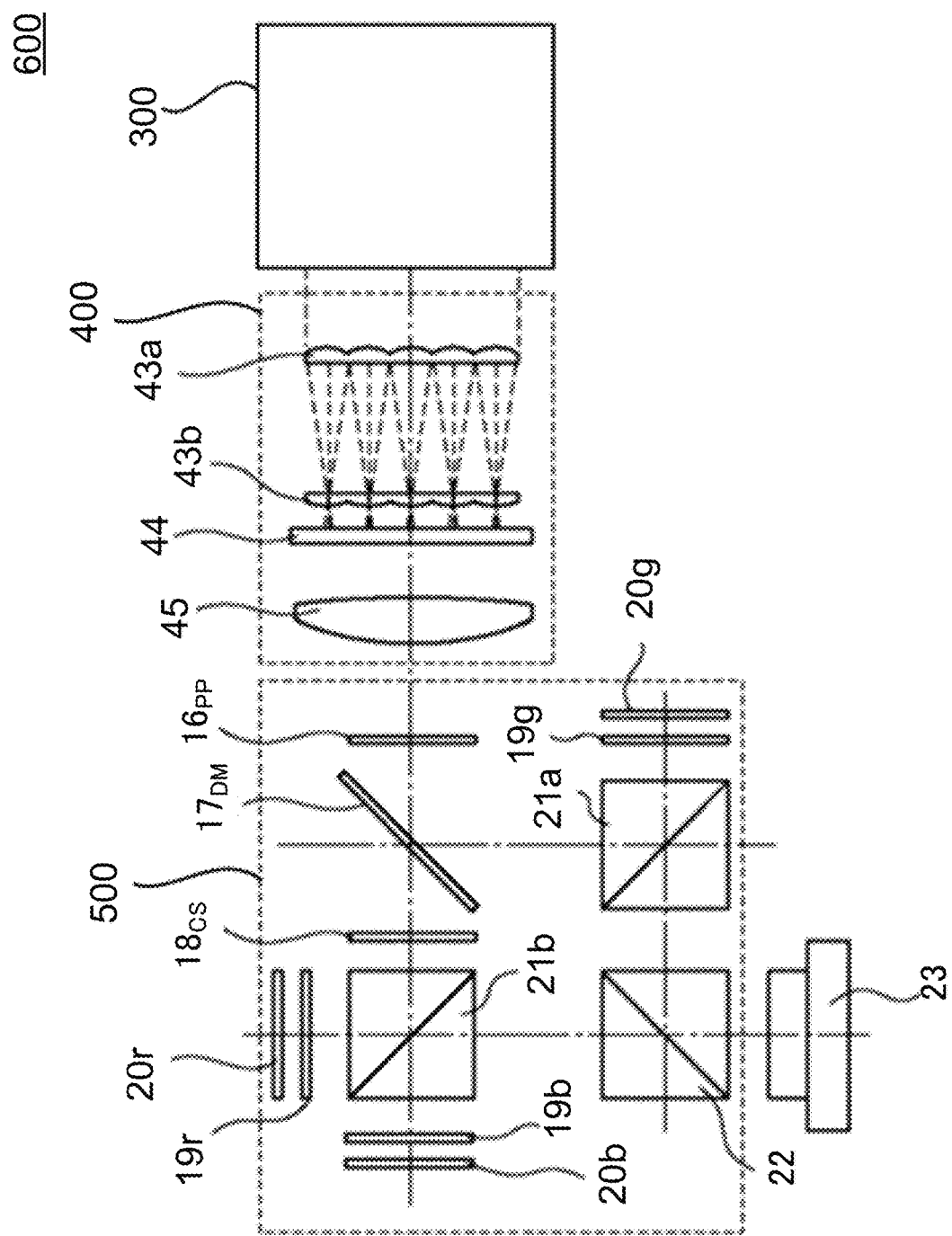
FIG. 25 illustrates a configuration of a projection type display apparatus according to a seventh embodiment.

Referring now to FIG. 25, a description will be given of a projection type display apparatus (projector) according to an eighth embodiment of the present invention. FIG. 25 is a structural diagram of a projection type display apparatus 600 according to this embodiment.

In FIG. 25, the projection type display apparatus 600 includes a light source apparatus 300, the illumination optical system 400, the color separating and combining unit 500, and the projection optical system 23 according to the fourth embodiment. The projection type display apparatus 600 may include the light source apparatus 300A according to the fifth embodiment or the light source apparatus 300B according to the third embodiment instead of the light source apparatus 300.

The illumination optical system 400 illuminates the following liquid crystal panel 20 (light modulation element) using a light flux from the light source apparatus 300. The illumination optical system 400 includes a fly-eye lens 43a (first fly-eye lens), a fly-eye lens 43b (second fly-eye lens), a polarization conversion element 44, and a condenser lens 45.

The light flux from the light source apparatus 300 is divided into a plurality of light fluxes by the fly-eye lens 43a, and forms a light source image between the fly-eye lens 43b and the polarization conversion element 44. The polarization conversion element 44 make uniform the polarization directions of the incident light fluxes to the predetermined polarization direction. The light flux from the polarization conversion element 44 is led to the color separating and combing unit 500 by the condenser 45.

The color separating and combining unit 500 includes a polarization plate $16_{PP}$, a dichroic mirror $17_{DM}$, a wavelength selective phase difference plate 18, a red liquid crystal panel 20r, a green liquid crystal panel 20g, and a blue liquid crystal panel 20b. The red liquid crystal panel 20r, the green liquid crystal panel 20g, and the blue liquid crystal panel 20b will be collectively referred to as a liquid crystal panel 20. The color separating and combining unit 500 further includes a red quarter waveplate 19r, a green quarter waveplate 19g, a blue quarter waveplate 19b, polarization beam splitters 21a and 21b, and a combining prism 22. The red quarter waveplate 19r, the green quarter waveplate 19g, and the blue quarter waveplate 19b will be collectively referred to as a quarter waveplate 19. The color separating and combining system is part of the color separating and combining unit 500 except the liquid crystal panel 20.

The polarization plate $16_{PP}$ transmits only light in the predetermined direction made uniform by the polarization conversion element 44. The dichroic mirror $17_{DM}$ guides the blue light and the red light in the light from the polarization plate $16_{PP}$ to the polarization beam splitter 21b (second polarization beam splitter), and guides the green light to the polarization beam splitter 21a (first polarization beam splitter).

The polarization beam splitters 21a and 21b guide the light from the dichroic mirror $17_{DM}$ to the liquid crystal panel 20 in accordance with the polarization direction, and guides the light from the liquid crystal panel 20 to the combining prism 22. The quarter waveplate 19 serves to provide a phase difference of $\lambda/2$ to the reciprocation of the reflection on the liquid crystal panel 20, and to improve the light detection effect.

The combining prism 22 combines the blue light and the red light from the polarization beam splitter 21a with the green light from the second polarization beam splitter 21b, and guides the combined light to the projection optical system 23. This configuration enables the projection type display apparatus 600 to project the color image onto the target plane, such as a screen.

Each embodiment can provide a light source apparatus and a projection type display apparatus, each of which can effectively combine spectra with each other. In other words, in addition to the light emission spectrum of the fluorescent substance, by combining the laser beams, such as R and G laser beams, the present invention can provide a small and bright projector with a broad color reproduction range and a high light utilization efficiency.

The light source apparatus according to each embodiment includes two light source units but may include three or more light source units. The first light source unit may use a wavelength conversion element configured to convert the excitation light into the red wavelength band light, instead of the wavelength conversion element configured to convert the excitation light into the yellow wavelength band light. In this case, the second light source unit includes a second solid-state light source configured to emit green wavelength band light, and the following conditional expression (9) may be satisfied where Pe is a light output from the first solid-state light source and Pg is a light output from the second solid-state light source.

$$Pe > Pg \tag{9}$$

Each embodiment can define each color wavelength band light as follows. The blue wavelength band light may be defined as light having a peak wavelength (maximum intensity wavelength, dominant wavelength) from 440 nm to 480 nm inclusive, the green wavelength band light may be defined as light having a peak wavelength from 500 nm to 540 nm inclusive, the red wavelength band light may be defined as light having a peak wavelength from 620 nm to 660 nm inclusive and the yellow wavelength band light may be defined as light having a peak wavelength from 540 nm to 580 nm inclusive.

Other Embodiments

Further, the present invention is not limited to these embodiments and various variations and modifications may be made without departing from the scope of the present invention.

Again, each embodiment uses two light source units, but the present invention is not limited to these embodiments and may use three or more light source units or may combine light fluxes from three or more fluorescent substances.

The fluorescent substance 8a (first wavelength conversion element) includes a first substrate, and a first wavelength conversion layer continuously formed in a first direction on the first substrate. The fluorescent substance 8b (second wavelength conversion element) includes a second substrate, and a second wavelength conversion layer continuously formed in a second direction on a second substrate.

More specifically, the first substrate may be circular, and the first direction may be a circumferential direction on the first substrate. The second substrate may be circular, and the second direction may be a circumferential direction on the second substrate. When the fluorescent substance 8 includes this structure and is made rotatable, the fluorescent layer (wavelength conversion layer) in the fluorescent substance 8 is prevented from deteriorating.

While the first and second substrates in the fluorescent substances 8a and 8b may reflect the light as described in each embodiment, these substrates may transmit the light.

In each embodiment, the illumination optical system C includes the first fly-eye lens 12 and the second fly-eye lens 13. However, the present invention is not limited to these embodiments, and may use a rod integrator instead of the first fly-eye lens 12 and the second fly-eye lens 13, for example.

In each embodiment, each lens cell in the first fly-eye lens 12 and the second fly-eye lens 13 has the same shape, but the present invention is not limited to these embodiments. For example, the lens cells in the first fly-eye lens 12 and the second fly-eye lens 13 may have different shapes. The aspect ratio of the effective area in this case can be calculated with compression ratios $\alpha$ and $\beta$. More specifically, a second section is set to a section parallel to the optical axis in the illumination optical system C and orthogonal to a first section. In addition, assume that $D1x$ is a width of the first fly-eye lens 12 on the first section, $D2x$ is a width of the second fly-eye lens 13 on the first section, $D1y$ is a width of the first fly-eye lens 12 on the second section, and $D2y$ is a width of the second fly-eye lens 13 on the second section.

Then, the compression ratio $\alpha$ on the first section and the compression ratio $\beta$ on the second section can be expressed as $\alpha=D2x/D1x$ and $\beta=D2y/D1y$. Where X' is a width of the light modulation element 16 on the first section and Y' is a width of the light modulation element 16 on the second section, the aspect ratio of the effective area is expressed as $(\alpha X'/2)/\beta Y'$ or $\alpha X'/(\beta Y'/2)$.

According to each embodiment of the present invention, $D1x=D2x$, $D1y=D2y$, and $X':Y'=16:9$, and each lens cell in the first fly eye lens 12 has a shape similar to that of the light modulation element 16 and thus $D2x(A):D2y(B)=16:9$. The aspect ratio of the effective area is $A/2:B$, and the effective area has a rectangular shape with an aspect ratio of 8:9.

While each embodiment uses a blue LD for the excitation light source, the present invention is not limited to this configuration and may use an LED other than the LD for the solid-state light source.

While each embodiment uses three reflective liquid crystal panels as a light modulation element, the present invention is not limited to these embodiments. For example, the present invention may use three transmission type liquid crystal panels as a light modulation element, or three angle-adjustable micro mirror arrays. When the light modulation element uses the micro mirror array, the illumination apparatus may not use the polarization conversion element 14. In this case, the effective area is defined as an area that contains each lens cell in the second fly-eye lens 13.

While each embodiment uses the first fly-eye lens 12 and the second fly-eye lens 13 for the integrator optical system in the illumination optical system C, the present invention is not limited to this configuration. The integrator optical system may use a rod integrator, four cylindrical lens arrays, or another configuration. When the integrator optical system uses the rod integrator, the effective area is defined as an area that contains the incident surface of the rod integrator.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2016-124963, filed Jun. 23, 2016, and 2016-088322, filed Apr. 26, 2016, each of which are hereby incorporated by reference herein in its entirety.

What is claimed is:

1. An illumination apparatus comprising:
an illumination optical system configured to illuminate a light modulation element;
a first light source unit that includes a first solid-state light source, a first wavelength conversion element configured to convert at least part of light from the first solid-state light source into first converted light that has a wavelength different from that of the light from the first solid-state light source, and a first light guide optical system configured to guide the light from the first solid-state light source to the first wavelength conversion element;
a second light source unit that includes a second solid-state light source, a second wavelength conversion element configured to convert at least part of light from the second solid-state light source into second converted light that has a wavelength different from that of the light from the second solid-state light source and a spectral distribution different that of the first converted light, and a second light guide optical system configured to guide the light from the second solid-state light source to the second wavelength conversion element; and
an optical path combining system that includes a first light guide surface configured to guide the light from the first light source unit to the illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

2. The illumination apparatus according to claim 1, wherein each of the first light guide optical system and the second light guide optical system includes a first lens surface array that includes a plurality of first lens surfaces configured to split light from a corresponding one of the first solid-state light source and the second solid-state light source, a second lens surface array that includes a plurality of second lens surfaces configured to receive light from the first lens surface, and a superimposing optical system configured to guide light from the second lens surface array to the wavelength conversion element.

3. The illumination apparatus according to claim 2, wherein the illumination apparatus includes a plurality of light source units that include the first light source unit and the second light source unit,
wherein the illumination optical system includes a polarization conversion element configured to convert a polarization direction of light from the optical path combining system, and
wherein $$0.7 \le \frac{X}{Y} \cdot \frac{y}{x} \le 1.3$$

is satisfied,
where an effective area is an area in an incident surface of the polarization conversion element, in which the polarization direction of the light from the optical path combining system is converted into a predetermined polarization direction, N is the number of light source units, the effective area is divided into N segments along at least one of a first side and a second side orthogonal to the first side of the effective area, X is a short side of the segment, Y is a long side of the segment, x is a short side of each first lens surface, and y is a long side of each first lens surface.

4. The illumination apparatus according to claim 1,
wherein the first light guide surface is a first reflective surface configured to reflect the light from the first light source unit, and
wherein the second light guide surface is a second reflective surface configured to reflect the light from the second light source unit, a position of the second light guide surface being different from that of the first reflective surface in a direction orthogonal to an optical axis in the illumination optical system on a plane parallel to the optical axis in the illumination optical system and a normal of the first reflective surface.

5. The illumination apparatus according to claim 4, wherein the optical path combining system includes a prism that includes the first reflective surface and the second reflective surface.

6. The illumination apparatus according to claim 1, wherein the first light guide surface is a first reflective surface configured to reflect the light from the first light source unit,
wherein the second light guide surface is a second reflective surface configured to reflect the light from the second light source unit and different from the first reflective surface, and
wherein the optical path combining system includes:
a first reflection mirror having the first reflective surface; and
a second reflection mirror having the second reflective surface, a position of the second reflection mirror being different from that of the first reflection mirror in a normal direction to a plane parallel to an optical axis in the illumination optical system and a normal of the first reflective surface.

7. The illumination apparatus according to claim 1, wherein the first light guide surface is a first reflective surface configured to reflect the light from the first light source unit, and
wherein the second light guide surface is a first transmission surface configured to transmit the light from the second light source unit, a position of the second light guide surface being different from that of the first reflective surface in a direction orthogonal to an optical axis in the illumination optical system on a plane parallel to the optical axis in the illumination optical system and a normal of the first reflective surface.

8. The illumination apparatus according to claim 1, wherein the first wavelength conversion element is a green fluorescent substance configured to convert at least part of light from the solid-state light source into green band light, and
wherein the second wavelength conversion element is a red fluorescent substance configured to convert at least part of light from the solid-state light source into red band light.

9. The illumination apparatus according to claim 1, wherein the first wavelength conversion element includes a first substrate, and a first wavelength conversion layer continuously formed in a first direction on the first substrate,
wherein the second wavelength conversion element includes a second substrate, and a second wavelength conversion layer continuously formed in a second direction on the second substrate, and
wherein a spectral distribution of light from the first wavelength conversion layer is different from that of light from the second wavelength conversion layer.

10. The illumination apparatus according to claim 9, wherein the first substrate is circular, and the first direction is a circumferential direction of the first substrate, and
wherein the second substrate is circular, and the second direction is a circumferential direction of the second substrate.

11. A projection type display apparatus comprising:
an illumination apparatus;
a first light modulation element, a second light modulation element, and a third light modulation element, each of which modulates light from the illumination apparatus; and
a color separating and combining system configured to guide the light from the illumination apparatus to the first light modulation element, the second light modulation element, and the third light modulation element, and to combine light fluxes from the first light modulation element, the second light modulation element, and the third light modulation element with one another,
wherein the illumination apparatus includes:
an illumination optical system configured to illuminate the first light modulation element, the second light modulation element, and the third light modulation element;
a first light source unit that includes a first solid-state light source, a first wavelength conversion element configured to convert at least part of light from the first solid-state light source into first converted light that has a wavelength different from that of the light from the first solid-state light source, and a first light guide optical system configured to guide the light from the first solid-state light source to the first wavelength conversion element;
a second light source unit that includes a second solid-state light source, a second wavelength conversion element configured to convert at least part of light from the second solid-state light source into second converted light that has a wavelength different from that of the light from the second solid-state light source and a spectral distribution different that of the first converted light, and a second light guide optical system configured to guide the light from the second solid-state light source to the second wavelength conversion element; and
an optical path combining system that includes a first light guide surface configured to guide the light from the first light source unit to the illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

12. The projection type display apparatus according to claim 11, further comprising a projection optical system configured to guide light from the color separating and combining system to a target plane.

13. The projection type display apparatus according to claim 11, wherein the color separating and combining system includes a polarization plate configured to transmit a larger amount of light having a predetermined polarization direction than that of light having a polarization direction different from the predetermined polarization direction.

14. A light source apparatus configured to combine light fluxes exiting from at least two or more light source units with one another and to generate combined exit light, the light source apparatus comprising:
a first light source unit; and
a second light source unit,
wherein the first light source unit includes:
a first solid-state light source configured to emit excitation light; and
a wavelength conversion element configured to convert the excitation light into light having a wavelength longer than that of the excitation light,
wherein the second light source unit includes a second solid-state light source configured to emit red wavelength band light,
wherein Pe>Pr is satisfied,
where Pe is a light output from the first solid-state light source and Pr is a light output from the second solid-state light source,
wherein the light source apparatus includes an optical path combining system that includes a first light guide surface configured to guide the light from the first light source unit to an illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

15. The light source apparatus according to claim 14, wherein the wavelength conversion element converts the excitation light into yellow wavelength band light or green wavelength band light.

16. The light source apparatus according to claim 14, wherein the first solid-state light source emits blue wavelength band light.

17. The light source apparatus according to claim 14, wherein the second light source unit includes a third solid-state light source configured to emit green wavelength band light, and
wherein Pr>Pg is satisfied, where Pg is a light output from the third solid-state light source.

18. The light source apparatus according to claim 17, wherein Pe>Pr×2, Pe>Pg×3, and Pr>Pg×1.5 are satisfied.

19. The light source apparatus according to claim 17, wherein there are a plurality of first solid-state light sources, a plurality of second solid-state light sources, and a plurality of third solid-state light sources, and each of the light outputs Pe, Pr, and Pg is a sum of corresponding light outputs from the plurality of solid-state light sources.

20. The light source apparatus according to claim 17, further comprising a filter configured to attenuate specific wavelength band light in a light flux exiting from the first light source unit,
wherein the specific wavelength band light contains at least wavelength band light between the red wavelength band light and the green wavelength band light, and does not contain the red wavelength band light or the green wavelength band light.

21. The light source apparatus according to claim 14, further comprising a filter configured to attenuate specific wavelength band light among a light flux exiting from the first light source unit,
wherein the specific wavelength band light contains at least wavelength band light between wavelength band light emitted from the first solid-state light source and the red wavelength band light, and does not contain the wavelength band light emitted from the first solid-state light source or the red wavelength band light.

22. The light source apparatus according to claim 14, wherein the second light source includes a light diffusion element configured to diffuse the red wavelength band light emitted from the second solid-state light source.

23. The light source apparatus according to claim 14, wherein the wavelength conversion element is a fluorescent substance and emits yellow or green fluorescent light.

24. A light source apparatus configured to combine light fluxes exiting from at least two or more light source units with one another and to generate combined exit light, the light source apparatus comprising:
a first light source unit; and
a second light source unit,
wherein the first light source unit includes:
a first solid-state light source configured to emit excitation light; and
a wavelength conversion element configured to convert the excitation light into light having a wavelength longer than that of the excitation light,
wherein the second light source unit includes a second solid-state light source configured to emit green wavelength band light, and
wherein Pe>Pg is satisfied,
where Pe is a light output from the first solid-state light source and Pg is a light output from the second solid-state light source.

25. The light source apparatus according to claim 24, wherein the wavelength conversion element is configured to convert the excitation light into red wavelength band light.

26. The light source apparatus according to claim 24, further comprising:
an optical path combining system that includes a first light guide surface configured to guide the light from the first light source unit to an illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

27. A projection type display apparatus comprising:
a light source apparatus configured to combine light fluxes exiting from at least two or more light source units with one another and to generate combined exit light;
a light modulation element;
an illumination optical system configured to illuminate the light modulation element using a light flux from the light source apparatus; and
a color separating and combining system configured to guide the light flux from the light source apparatus to the light modulation element, and to guide a light flux from the light modulation element to a projection optical system,
wherein the light source apparatus includes:
a first light source unit; and
a second light source unit,
wherein the first light source unit includes:
a first solid-state light source configured to emit excitation light; and
a wavelength conversion element configured to convert the excitation light into light having a wavelength longer than that of the excitation light,
wherein the second light source unit includes a second solid-state light source configured to emit red wavelength band light,
wherein Pe>Pr is satisfied,
where Pe is a light output from the first solid-state light source and Pr is a light output from the second solid-state light source,
wherein the light source apparatus includes an optical path combining system that includes a first light guide surface configured to guide the light from the first light source unit to the illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

28. A projection type display apparatus comprising:
a light source apparatus configured to combine light fluxes exiting from at least two or more light source units with one another and to generate combined exit light;
a light modulation element;
an illumination optical system configured to illuminate the light modulation element using a light flux from the light source apparatus; and
a color separating and combining system configured to guide the light flux from the light source apparatus to the light modulation element, and to guide a light flux form the light modulation element to a projection optical system,
wherein the light source apparatus includes:

a first light source unit; and
a second light source unit,
wherein the first light source unit includes:
   a first solid-state light source configured to emit excitation light; and
   a wavelength conversion element configured to convert the excitation light into light having a wavelength longer than that of the excitation light,
wherein the second light source unit includes a second solid-state light source configured to emit green wavelength band light, and
wherein Pe>Pg is satisfied,
where Pe is a light output from the first solid-state light source and Pg is a light output from the second solid-state light source.

29. The projection type display apparatus according to claim 28, wherein the wavelength conversion element is configured to convert the excitation light into red wavelength band light.

30. The projection type display apparatus according to claim 28,
wherein the light source apparatus includes an optical path combining system that includes a first light guide surface configured to guide the light from the first light source unit to the illumination optical system, and a second light guide surface different from the first light guide surface and configured to guide light from the second light source unit to the illumination optical system,
wherein the first light guide surface viewed from an optical axis direction of the illumination optical system does not overlap the second light guide surface and is provided at a position different from that of the second light guide surface,
wherein the optical path combining system includes a first condenser optical system configured to form a first light source image on the first light guide surface using the light from the first light source unit, and a second condenser optical system configured to form a second light source image on the second light guide surface using the light from the second light source unit, and
wherein $0.7 \leq d1/d2 \leq 1.3$ is satisfied,
where when viewed from the optical axis direction of the illumination optical system, d1 is a distance between the first light source image and the second light source image and d2 is a width of the first light source image in a direction in which the first light source image and the second light source image are arranged.

* * * * *